(12) United States Patent
Scanlon

(10) Patent No.: US 7,564,587 B2
(45) Date of Patent: *Jul. 21, 2009

(54) METHOD OF SCORING A PRINTED FORM HAVING TARGETS TO BE MARKED

(75) Inventor: Edward F. Scanlon, Enfield, CT (US)

(73) Assignee: Scan-Optics LLC, Manchester, CT (US)

( * ) Notice: Subject to any disclaimer, the term of this patent is extended or adjusted under 35 U.S.C. 154(b) by 367 days.

This patent is subject to a terminal disclaimer.

(21) Appl. No.: 11/439,649

(22) Filed: May 24, 2006

(65) Prior Publication Data

US 2007/0272753 A1    Nov. 29, 2007

(51) Int. Cl.
G06F 15/00 (2006.01)
G06K 7/10 (2006.01)

(52) U.S. Cl. .................................. 358/3.01; 235/454

(58) Field of Classification Search ................. 358/1.4, 358/1.7, 1.9, 3.01, 1.18, 474, 528; 382/151, 382/181, 287; 235/454
See application file for complete search history.

(56) References Cited

U.S. PATENT DOCUMENTS

| | | | | | |
|---|---|---|---|---|---|
| 5,262,624 | A | * | 11/1993 | Koch | 235/456 |
| 5,420,407 | A | * | 5/1995 | Grundy, Jr. | 235/454 |
| 5,729,665 | A | * | 3/1998 | Gauthier | 358/1.18 |
| 6,079,624 | A | * | 6/2000 | Apperson et al. | 235/494 |
| 6,741,738 | B2 | * | 5/2004 | Taylor | 382/187 |
| 6,970,267 | B1 | | 11/2005 | Scanlon | 358/1.4 |
| 2007/0272753 | A1 | * | 11/2007 | Scanlon | 235/454 |

* cited by examiner

Primary Examiner—Gabriel I Garcia
(74) Attorney, Agent, or Firm—Alix, Yale & Ristas, LLP

(57) ABSTRACT

A digital form scoring system that does not require that the targets on the marked form be digitally captured with a drop-out scanner. This is accomplished by locating each target, and in the mark interpretation logic, sensing an area within the outline of the target, then digitally removing all or most of thin lines of print that form a symbol or character within the outline, and removing the shading in the background, before applying the logic that determines whether a region of dark gray scale values in the sensing area should be considered a valid mark entered by the subject.

13 Claims, 15 Drawing Sheets

FIGURE 12

METHOD OF SCORING A PRINTED FORM HAVING TARGETS TO BE MARKED

BACKGROUND OF THE INVENTION

The present invention relates to the automated scoring of so-called "bubble" forms or the like, whereby each of a multiplicity of end users such as students, voters, and questionnaire respondents, enters marks on a standard form associated with the individual, to indicate the specific choices from among those offered on the form. The marks are typically entered by darkening (filling in) preprinted circles or ellipses with a pencil. Inevitably, some of the respondents apply very light pressure on the pencil and therefore produce a very light mark. The marks made by other respondents may either extend out of the designated target, or partially within and partially outside of the target. In other cases, a stray mark may inadvertently be made near a target. These deviations give rise to the need for interpretation of the intent of the user. This is in addition to deviations that arise from imperfect printing of the form, and misalignment or bending of the form as it passes through the scoring system.

Under the present state of the art, bubble forms are processed with highly specialized scanners that sense the marked state of the bubble targets using a fixed array of LED sensors. These scanners do not work by producing an electronic image reproduction of the contents of the forms; they merely sense the darkness levels of certain predefined fixed locations of the forms. On a form page of dimension 8½×11 inches, the typical bubble density is approximately six bubbles per inch in each of the page dimensions. This is similar to the LED sensor density and thus, one LED sensor is associated with each column of bubble locations. In order to achieve and maintain their accuracy rates, these scanners require extremely high quality paper with very precise printing and cutting. Production of such forms is very expensive and is usually available only from a single source, namely, the same company that produces the LED scanner.

U.S. Pat. No. 6,970,267 discloses a system and method that uses electronic image capturing technology in conjunction with specialized image processing techniques for performing the scoring. That invention works with an image capture scanner that produces an electronic reproduction of each form. The electronic images are processed to produce scoring results that achieve an accuracy rate equal to or better than those achieved by the LED scanners. Various makes and models of scanners may be used, but the most accurate results are achieved when using scanners that produce gray-scale image output. It is therefore not necessary to use expensive paper and printing processes as is required by the LED scanners. Thus, paper and printing costs can be greatly reduced without sacrificing accuracy.

The master printed form is scanned and processed according to a forms definition program to produce a virtual form file comprising a virtual layout of the significant regions such as bubble targets of printed material on the form, on a virtual coordinate system. Production forms that have been marked by subjects (e.g., students, voters, survey respondents, etc.), are then scanned to produce a marked form file of gray scale darkness values for each marked form. The marked form file and the virtual form file, are compared and processed to determine the location and spatial relationships of the marks on the marked form, in relation to the virtual coordinate system of the virtual form. The raw scan of each marked form is also processed to determine whether darkened areas on the marked form image should be interpreted as intentional responses from the subject, at the virtual coordinates where targets are located on the virtual form.

The master preprinted form preferably includes a plurality, typically four, preprinted reference marks at, e.g., the corners, as do the forms to be marked by the subjects. Because the reference marks are relatively accurately positioned on both the master pre-printed form and the preprinted form given to each subject, the coordinates of the reference marks on both the preprinted forms and in the virtual coordinate system are established with a high degree of accuracy. To the extent the coordinates of the reference marks in the marked form file differ form the coordinates of the reference mark of the virtual form (or, master template) in the virtual coordinate system, adjustment can be made for the deviations arising from skew, shift, stretch (scale), and slant, such that the coordinates associated with each target on the scanned marked form file can be appropriately offset or adjusted relative to the coordinates of the master template form in the virtual coordinate system. In this manner, marks made by the subject on the form, as represented by gray scale darkness values in the marked form file, can be better associated with a target location and employed in various interpreting rules to confirm whether a score for a particular target should have one or the other of a binary value, e.g., "intentionally marked" or "intentionally left blank". The score for a target or field could instead be indeterminate due to excessive uncertainty or to an invalid relation with other targets or fields. The term scored value should be understood in the most general sense, as indicative of an evaluation made of an active, passive, positive or negative, indeterminate or invalid response to e.g., a bubble.

Furthermore, the relatively high resolution of the scanned image, e.g., hundreds of positions (pixels) per inch, permits gray scale darkness sampling in a region or zone surrounding each target location (as offset or adjusted) to ascertain the most likely center of a candidate mark, and to ascribe a level of darkness to the candidate mark, which in combination with the imputed distance from the center to the adjusted target location, provide inputs to a logic operation for concluding whether or not a candidate mark is of sufficient darkness and close enough to the expected location, to warrant an interpretation that the mark is an intentional response.

Many of the interpretive variables are under the control of the user, i.e., the entity having the responsibility for scoring the marked forms. These interpretive rules are specified for the virtual or master template form file obtained from the master preprinted form, before the marked forms are scanned and scored. The variables associated with defining the virtual form or master template, and with interpreting candidate marks, are preferably implemented by such user, with the aid of a graphical user interface whereby various tools can be employed on the virtual layout of the preprinted form on the virtual coordinate system.

The overall system and method described in U.S. Pat. No. 6,970,267 are hereby incorporated by reference as disclosing the preferred context of the present invention. This prior system and method are well suited for scoring marks on printed forms of a type in which the reference marks are made with dark, non-dropout ink, and of sufficient quantity and placement to assure good matching between the implied coordinate system of the marked form to be scored and the virtual coordinate system of master form. Although forms specifically designed for use with that system as well as many other commercially available forms have suitable reference marks, some users have a huge inventory or long-term purchase commitment for forms that are suitable for LED scanners, but not digital scanning. The reference marks and/or timing marks along the edges of these forms could be printed in colors or dropout ink that might not be readily and quickly interpreted by a digital system that relies only on scanned or computed gray scale values for the non-dropout reference marks and the pencil marks or the like to be scored.

The overall method of the incorporated patent has innovative aspects that are not dependent on whether the targets are dropped out of a scan of the marked form, such as but not limited to the determination of a virtual coordinate system, the accurate location of reference marks and targets, and the logic for interpreting marked areas associated with targets. However, this prior method and system can be more universally effective, if the marked forms can be read or captured with a non-dropout scanner.

The machine-readable form typically has a field bounded by known coordinates on the form. The form may have broad stripes of alternating shading or colors, so that some of fields or portions of a given field have a printed background color. The field contains a group of spaced apart printed outline targets of known size and nominal location within the field, each target outline surrounding a printed symbol. At least some of the printed target can overly the background color. The form to be scored is designed to elicit at least one mark per field, although the subject may leave some fields unmarked, or mistakenly enter two marks. In any event, a form to be scored is expected to have at least one field where the subject has entered one mark on or near a target in the field.

The problem addressed by the present invention, is that, on the one hand, digital capture of all the print and marks on a form to be scored, provides the most potentially usable information for confirming the locations of all the targets, but the printed matter interferes with the identification and validation of the marks entered by the subject. This problem is exacerbated when a particular scoring system purchased and operated by a scoring contractor or service, must be capable of handling a wide variety of forms, printed in a variety of inks, with a variety of reference (alignment) or timing marks, and with a variety of sizes, shapes, and associated characters or symbols.

SUMMARY OF THE INVENTION

It is an object of the present invention to provide a digital form scoring system that does not require that the targets on the marked form be digitally captured with a drop-out scanner.

This is accomplished by locating each target, and in the mark interpretation logic, sensing an area within the outline of the target, then digitally removing all or most of thin lines of print that form a symbol or character within the sensing area or outline, and preferably removing background shading in the sensing area, before applying the logic that determines whether a region of dark gray scale values in the sensing area should be considered a valid mark entered by the subject.

One basic method embodiment is directed to generating a darkness value for each of a multiplicity of bubble targets printed on a substrate having a printed background, wherein each target is formed as an outline and an alphanumeric symbol within the outline, from a digital scan file of pixels having respective gray scale values, by sampling and analyzing the gray scale patterns of pixels using a programmed digital compute. The steps include defining a sensing area of pixels within the outline; in the sensing area, filtering out at least some of the pixels associated with the symbol; applying evaluation criteria to the pattern of gray scale pixel values in the filtered sensing area; and from the applied evaluation criteria, generating a darkness value for the target.

Another basic method embodiment is directed for the improvement comprising filtering out pixels having a darkness value below a threshold value derived from the statistical distribution of pixel darkness values over an area that includes a plurality of targets but excluding the outlines of the targets.

A preferred embodiment includes the steps of non-dropout scanning the field of related targets and storing as a digital file, captured pixel data values corresponding to gray scale darkness values of all pixels in the field, then identifying the pixels that lie in a sensing area inside of the pixels corresponding to the target outline. In the sensing area, pixels that form part of a thin line are identified and filtered out in the mark interpretation logic. The gray scale values of an area that includes a plurality of targets are then subjected to a statistical mode analysis to obtain a gray scale value indicative of the background. The mark interpretation logic filters out pixels having a darkness value below a threshold value dependent on the derived background value, then determines whether pixels in the sensing area having a gray scale value above the threshold, when aggregated, meet the size and/or shape criteria for a valid mark according to the interpretation logic.

Another aspect or embodiment the invention is directed to a method for scoring a machine-readable form having a field bounded by known coordinates on the form, at least some fields having a printed background color. The field contains a group of spaced apart printed outline targets of known size and nominal location within the field, each target outline surrounding a printed symbol and at least one target having a dark mark to be evaluated with interpretation logic as a valid score. The method includes non-dropout scanning the field and storing as a digital file, captured pixel data values corresponding to gray scale darkness values of all pixels in the field, then identifying the pixels that lie in a sensing area inside of the pixels corresponding to the target outline. In the sensing area, pixels that form part of a thin line associated with a symbol are filtered. Also, the statistical distribution of gray scale values of all or at least most pixels in the field (e.g., excluding the outline print) are analyzed to obtain an indicator background gray scale value. The mark interpretation logic filters out pixels having a darkness value below a threshold value dependent on the indicator background value. This is followed by determining whether pixels in the sensing areas having a gray scale value above the threshold, when aggregated, meet the size and/or shape criteria for a valid mark according to the interpretation logic, and recording a score for the field as having no valid marks or a valid mark at a particular target.

It should be appreciated that the targets can be located within the fields by any suitable methodology. Furthermore, the "filtering out" of the thin lines within a target, and the "filtering out" of the background shading, need not be implemented together. Some targets may not have symbols, and some forms may not have shading. In the present context, "filtering out" encompasses excluding, or reducing the gray scale value of a given pixel so that it is still sampled by the mark interpretation logic but its contribution to a "mark" is ignored or minimized.

BRIEF DESCRIPTION OF THE DRAWINGS

FIG. 1 is a representation of a preprinted form containing a multiplicity of bubbles or targets, to be used as a master form by the user in setting an operational implementation of the invention, and used by a subject, such as a student, to selectively mark targets with a lead pencil or the like to indicate responses to questions or the like;

FIG. 12 is a representation of an input screen for biasing the shading removal filter by target;

DESCRIPTION OF THE PREFERRED EMBODIMENTS

I. System Overview

The system and method according to the incorporated disclosure and present disclosure can be implemented in a variety of contexts, with only the preferred embodiment described in the present specification. This preferred embodiment is in the context of a multi-page student examination booklet with associated bubble targets, which the students mark with an ordinary lead pencil to indicate the selected responses to the examination questions. It should be understood that the terminology, labels, and screen displays described in the present application are for illustrative purposes only and that the claims, not the preferred embodiment as described, define the scope of patent rights.

Figure 1:
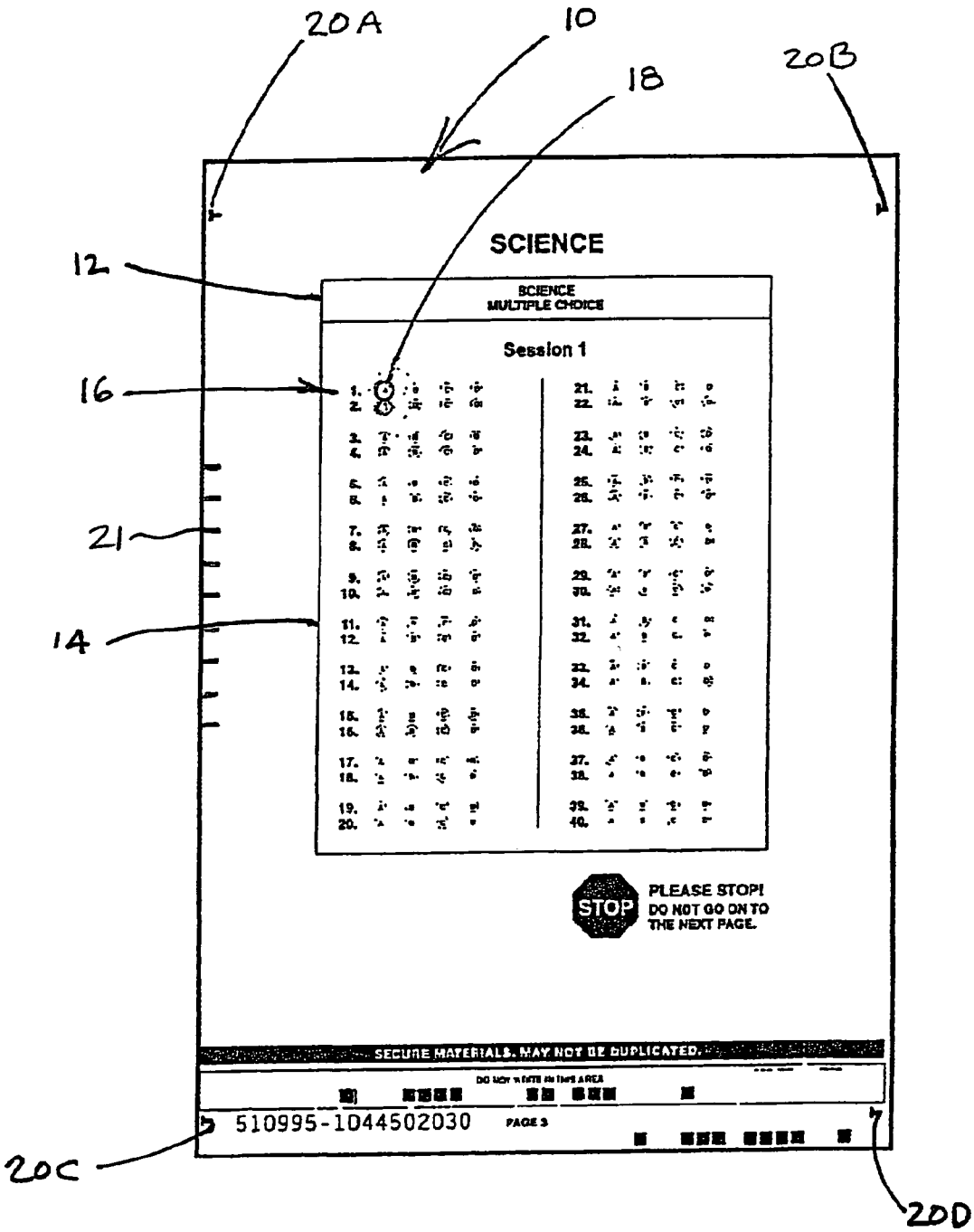

FIG. 1 is a representation of a one page, preprinted master form 10 which may contain a plurality of sections such as 12, 14. Section 14 has a multiplicity of target groups, one of which is shown at 16, consisting of a plurality of targets 18. In this example, the target group 16 is associated with question number 1 and each of the targets A, B, C and D is indicated by a preprinted circle with a letter centered therein. It is convenient to consider the relevant information content of each prompt in a section, to be an optical mark read field (OMR Field), i.e., a related set (group) of targets that produce a single answer for its output, in this instance, the answer or response for a given question prompt. A section could also be considered a field, if the output is the number of correct answers in that section. Generally herein, "field" will refer to each target group 16, in distinction from section field. Thus a question field can be a subset of a section field.

The master form has a plurality, preferably four, accurately positioned reference marks 20A, 20B, 20C, and 20D preprinted with either dropout or non-dropout ink, which will produce a vivid dark gray scale image when scanned. Similarly, the individual targets 18 can be printed in either dropout or non-dropout ink. Timing marks 21 may also be present along one longitudinal edge.

The master form 10 can be considered as a two-dimensional rectilinear object on which is superimposed a coordinate system such that each preprinted item e.g., reference mark or target, can be located according to a pair of coordinates. The location of an item is preferably expressed as a rectangular area specification, in the form of a set of four real numbers that specify the locations of the top, bottom, left, and right sides of a rectangle (or axis intercepts of an ellipse) in cartesian coordinates. This provides the basis for a target definition which is a rectangular or elliptical area specification that defines the location and size of an area to be sensed by the scoring program to determine whether a mark (either a reference mark or a student's pencil mark) is present at a single target such as 18.

In a typical student examination booklet, a plurality of forms are provided, with some sections calling for the student to enter the name, date of birth, sex, race/ethnicity, social security number, or other identifying or demographic information, in addition to the substantive test covering a number of curriculum areas. It should be understood that some of the terms in this patent specification may be used interchangeably with reference to a job having multiple pages and mixed contents, or a job having a single page with substantially more homogeneous content. The latter is a subset of the former. In general, from the point of view of the user who is to score test booklets, a job consists of all the pages marked by the students that will be processed together in a batch. This typically includes all the pages of a booklet, plus any school or class headers and the like that may be scanned with the booklet.

Figure 2A:
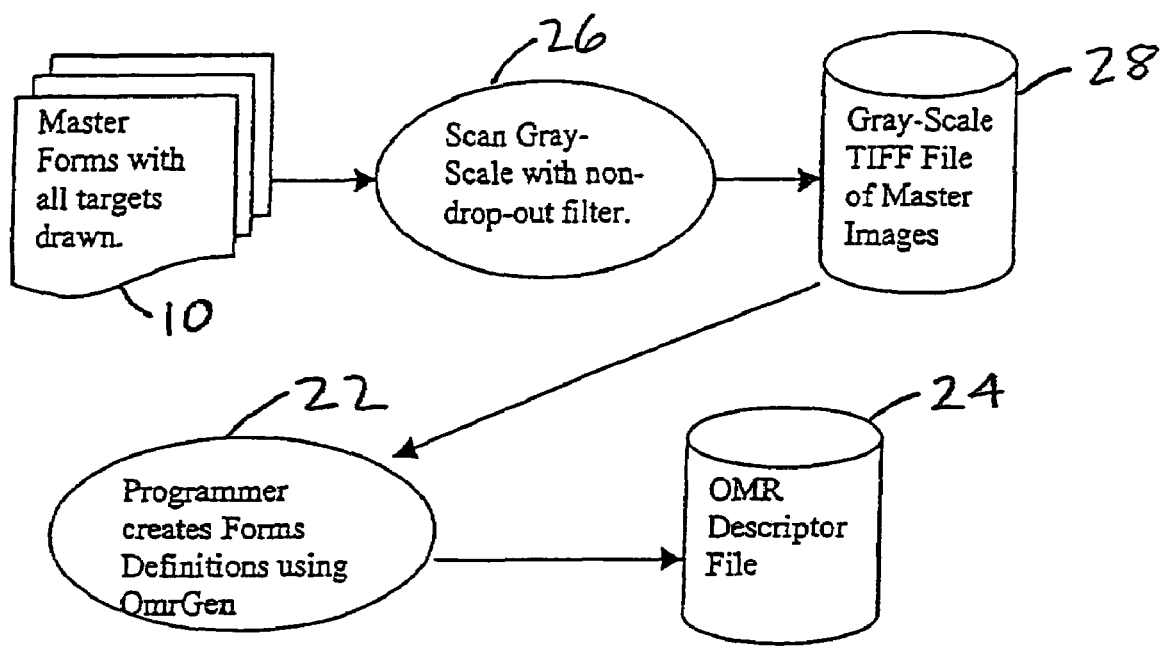
FIG. 2A is a schematic of the steps by which the OMR Form Descriptor file is generated based on the master forms and FIG. 2B is a schematic of the steps for the scoring of respondents' marked forms.
Figure 2B:
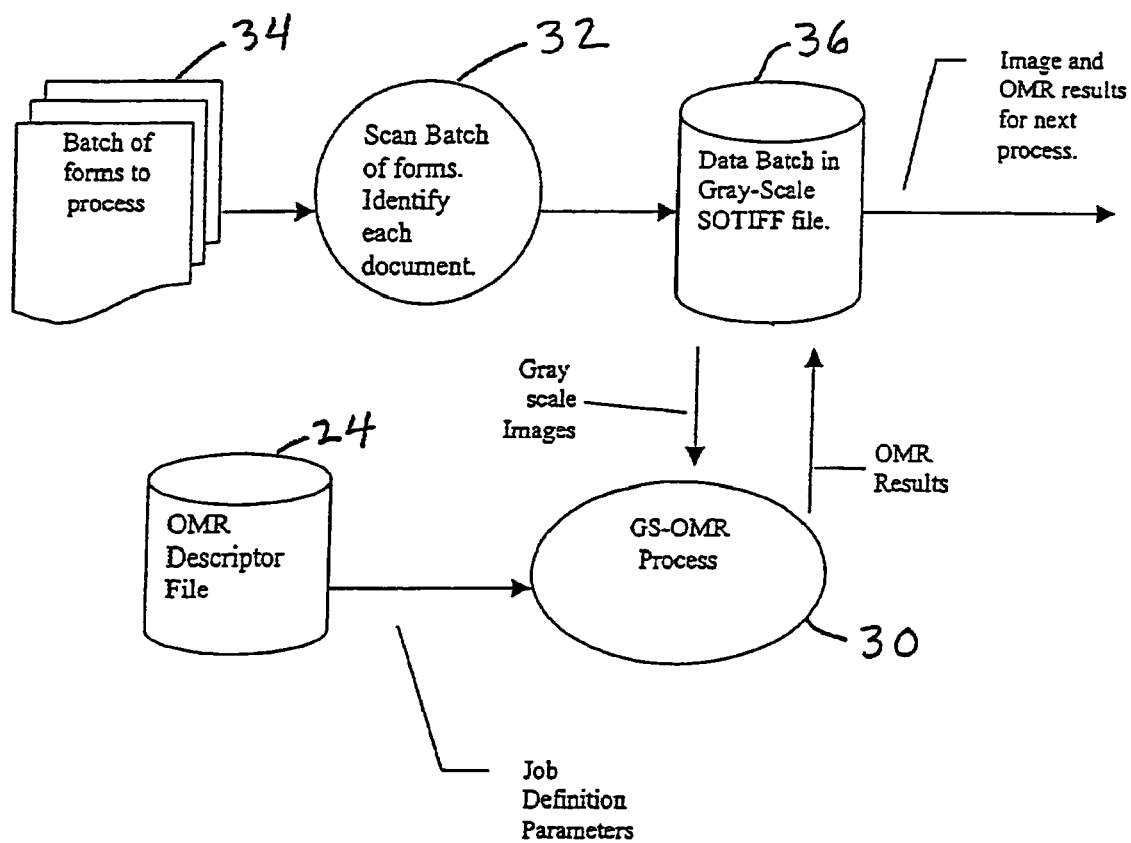

The system includes two major program components. The first is the form definition tool called OmrGen. This component is used to precisely define the locations and interpretations of each bubble target on each form type to be processed. The other component is the run-time scoring engine that takes the scanned images of marked booklets from the scanner, and the forms definition information from the OmrGen program, and produces the score results. FIGS. 2A and 2B are schematics of the steps by which the OMR Descriptor file is generated based on the master forms, and the steps for the scoring of respondents' marked forms, respectively.

OmrGen 22 is a Forms Definition Tool, preferably runs on a PC at the user's facility. OmrGen will locate the OMR and Reference Mark targets on the master image or template as the user (application programmer) is defining the search areas. Additionally, OmrGen allows the defining of the actual OMR field type (e.g. multiple choice producing a single answer such as Y/N or A/B/C/D; or a 2-D-array of targets producing a string). The output of the OmrGen tool is an "Omr Descriptor" ASCII file 24.

The Forms Definition process consists first of scanning a master image of each of the pages 10 that will comprise the job. For the best and easiest results, all the OMR target bubbles 18 must be clearly visible on the master images 26. The master images should then be scanned in a full color recognition format, such a "jpg" from which gray-scale values can be derived via the RGB and YCrCb or via the HSL specification. For added convenience, all pages of a single job may be scanned into one single multi-image TIFF file 28. Using OmrGen 22 the user programmer creates a new job and selects the master image file and page number for each page being defined.

The purpose of the GS-OMR run-time engine 30 is to process the batches of production images 32 of the students' marked forms 34 according to the forms definitions contained in the OMR Job Descriptor files. The OMR field results produced by GS-OMR are written back into a new header or the like in the SOTIFF file 36.

The GS-OMR run-time engine 30 runs as a stand-alone and basically unattended process on a PC at the user's facility. The two main inputs to this module are multi-image TIFF files 36, such as those generated by the Series 9000 scanner available from Scan Optics, Inc, (SOTIFF files) and the OMR Job Descriptor "ODS" files 24 generated by the OmrGen Forms Definition Tool 22.

For each form (page), the GS-OMR processes each Reference Mark field and each OMR field as defined for that document type in the job's ODS file. The output of the Reference Mark field reads is used internally by the GS-OMR for each form for adjusting the OMR target coordinates in order to correct for the various image distortions introduced in the scanning process. This allows GS-OMR to more precisely locate each target. The output of each OMR read field is written out to the SOTIFF file. The information to be output for each OMR field includes the Field Name (as defined in OmrGen), the field coordinates X, Y, width, and height (as defined in OmrGen and adjusted by the Reference Mark reads), and the Field Value. The Field Value is the ASCII representation of the OMR field result as interpreted according to the OMR field definition parameters. For example, suppose an OMR field has a target group 16, four targets 18 defined and labeled A, B, C, and D, respectively. GS-OMR will examine the respective target locations and return the one label, A, B, C, or D, which corresponds to the one target that is deemed to be marked. If no target is marked or multiple targets are marked, then the appropriate default symbols will be output for the field.

It should be appreciated that, at a basic level, the reference marks are used to properly "orient" the marked form onto the coordinate system of the virtual form, thereby inferring the nominal locations of all the targets in the marked form on the assumption that the relation of the targets to the reference marks of the marked form is known apriori.

Preferably, however, deviations or distortions associated with scanning of the marked forms are handled to adjust the nominal locations of the targets. The adjustments for correcting deviations of the marked forms relative to the printed master and digital virtual forms can be based on a variety of relative offsets. For example, when the gray scale pixels of the reference marks of a given marked form are compared with the reference mark coordinates and criteria of the virtual form, the algorithm can adjust the virtual location of the targets in the virtual form, and then compare these with the gray scale pixels of the marked form file. Alternatively, the gray scale pixels of the marked form (or the derived center of each cluster thereof) can be virtually offset to implement the adjustment before comparison with the location of the virtual targets of the virtual form. These are equivalent techniques and recitation of either should be understood as including the other.

Similarly, whereas a target or target search zone is virtually drawn or otherwise defined for each target in the virtual form file, the marked production forms will be scanned with either drop out or non-drop out filters. Even if no outline or image of a bubble or the like, will be represented in the marked form file, it should be understood that one can nevertheless refer to a "target" in the marked form file, as an area within a coordinate space corresponding to the nominal location or adjusted nominal location of a target in the virtual form file. Thus, the "target" locations of each form in the marked form file, can be defined and adjusted relative to the nominal target location in the virtual form file.

Figure 3:
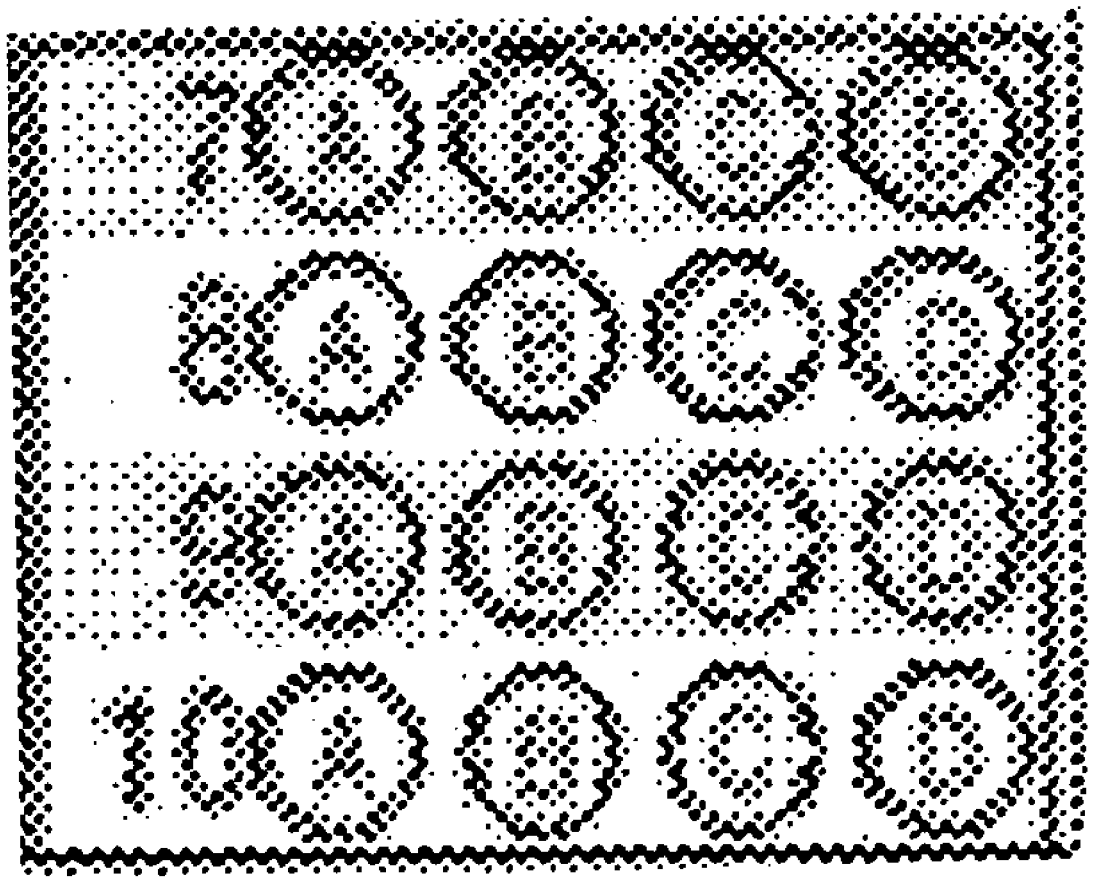
FIG. 3 is a representation of a portion of a form, showing a field containing a group of targets.

FIG. 3 illustrates four groups of targets A-D, associated with a respective four questions in a section of a page of an answer booklet, where background shading on the form produces horizontal strips of alternating darker and lighter regions which when scanned with a non-dropout filter, produce regions of higher and lower gray scale values. Groups for questions seven and nine are in shaded regions, whereas the group for questions eight and ten are a light (non-shaded) region. In this example, the subject has stroked a pencil over the printed target A for question seven, partially filling the target and extending partially outside the target. This is intended to be a solid mark (indicating the choice of answer A), but some background remains exposed within the marked target, and fully exposed in the other targets B, C, and D. Typically, the field associated with all odd numbered questions will be shaded and the fields associated with the even numbered questions will be non-shaded, or visa versa.

The problem addressed by the present invention, is that when scanned with a non dropout filter, each target will have a significant number of dark pixels associated with the printed circle and circumscribed letter, but the scoring method must select only target A as a candidate mark, and confirm that, notwithstanding that the target is not completely and perfectly filled, the subject intended to select A as the answer. One can appreciate that in some instances the subject will not answer some questions, will make a stray black line near a target, or will attempt to change an answer by erasing the first mark and entering a different mark. All of these other scenarios must also be handled by processing the image file produced from a non-dropout scanner.

With the preferred implementation of the present invention in a flexible end user system, the user has the option of scanning with or without dropout. This will usually depend on the content of the form to be processed.

It should be appreciated that one of ordinary skill in the relevant field could, based on the following detailed description, select commercially available hardware and produce computer code in a commercially available language, for making and using the invention without undue experimentation.

II. Detailed Description 1.0 Introduction

OmrGen 22 is a tool that provides the capability of defining all the information necessary for reading and interpreting the "bubble" targets on test booklets and similar forms. OmrGen provides a graphical user interface to allow the user to easily and accurately define the regions of interest on the forms to be processed. Using scanned images of booklet pages as templates, the user identifies the locations and interpretations of the bubble targets. Various reading and editing rules are also specified. The output of the OmrGen 22 is an "OmrGen DEScriptor" file 24, which contains all the information, defined for a job. The features of OmrGen include the ability to process color, gray-scale as well as bi-tonal images and automatically locate reference marks within defined search areas.

2.0 Glossary of Terms

Mark—The state or classification of a target whose Read Level is at or above the defined Minimum Read Level for a Mark.

Maximum Read Level for an Omit—an OMR field property which defines the maximum numeric value that a Read Level for a target may have in order for that target to be classified as an Omit.

Minimum Read Level for a Mark—an OMR field property which defines the minimum numeric value that a Read Level for a target must have in order for that target to be classified as a Mark.

Omit—The state or classification of a target whose Read Level is at or below the defined Maximum Read Level for an Omit.

OMR Field—(Optical Mark Read Field) the definition of a related set of targets that produce a single answer for its output. An OMR field definition contains the following elements: a name, a rectangular area specification of an area of the page, a collection of target definitions, and a set of properties that define how the target definitions are to be interpreted.

Page Definition—A Page Definition contains all the information necessary to read and process a single printed side (face) of a page of a booklet. A Page Definition consists of a collection of OMR Fields and REF Fields that are used for registering and reading the targets of a particular page type. A Page Definition also contains a set of properties, which include Document Name and Template Image.

Read Level—The "darkness" of a target as sensed by the optical reader. The Read Level is usually normalized into the range of 0 through F (this is hexadecimal notation for the numeric values 0 through 15) where 0 is the lightest possible sense reading and F is the darkest.

Rectangular Area Specification—a set of four real numbers that specify the locations of the top, bottom, left, and right sides of a rectangle in Cartesian coordinates. A Rectangular area specification is usually given in units of inches.

REF Field—(Reference Mark Field) the definition of an area of the page that contains a pre-printed reference mark. Reference marks are used to re-align an image to compensate for the various distortions in it introduced by the scanning process. A REF field definition contains two elements, a rectangular area specification that defines a search area, and the actual reference mark location.

Target (synonymous with "Bubble")—a pre-printed circular or elliptical shaped object on a form whose purpose is to be either filled in (marked) or left blank (omitted) by the examinee for the purpose of recording responses.

Target Definition—A rectangular area specification that defines the location and size of an area to be sensed for the Read Level of one single Target. Every Target Definition belongs to an OMR Field.

Target Group—A subset of the Target Definitions of an OMR Field that together produce a single character position of the output of the OMR Field. There is a one-to-one correspondence between Targets Groups and character positions of the OMR Field's output string. Every Target Definition of an OMR Field belongs to one and only one Target Group. Target Groups form a logical grouping of targets, typically into rows or columns, where each row or each column forms a group of targets which together produce a single character of an output string. For example, a "Last Name" OMR Field might have 312 targets arranged into 12 columns and 26 rows, where each row is labeled as A-Z. In this case, the 26 targets of each column would belong to a Target Group, and the OMR Field would produce a 12-character string as its output, one character position for each of the 12 Target Groups of the OMR Field. For another example, a "single-question" OMR Field containing five targets, labeled A-E, would typically be defined to have one Target Group that contains all five of the targets, and produces a single-character output.

Uncertain—the state or classification of a target whose Read Level is above the defined Maximum Read Level for an Omit and below the defined Minimum Read Level for a Mark.

3.0 Jobs

Figure 4:
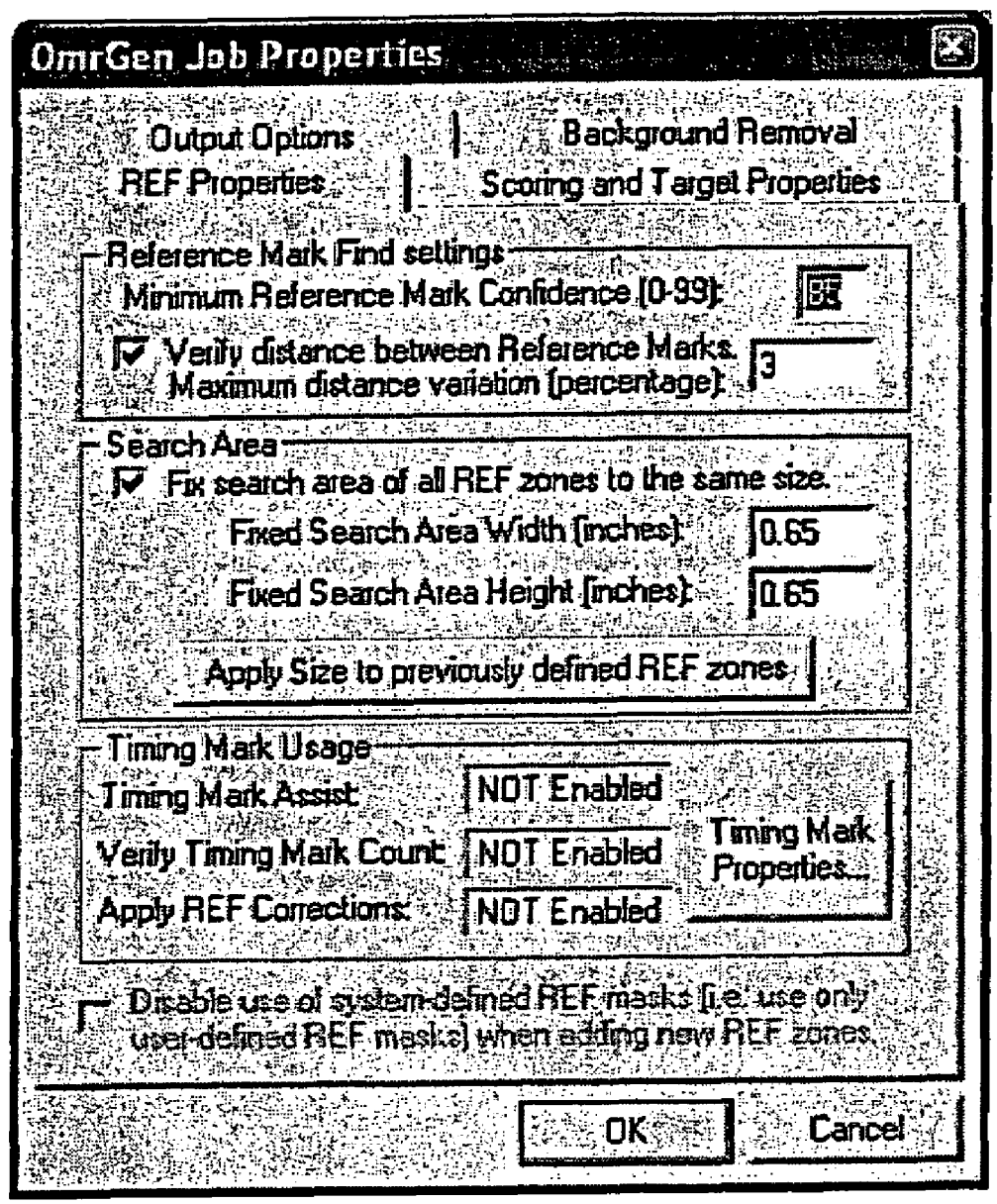
FIG. 4 is a screen shot showing the Job Properties dialog box, for allowing the user to view and edit job-wide settings and definitions, with the REF Properties options displayed.

A job consists of the definitions of all the pages that will be processed together in a batch. This typically includes all the pages of a booklet, plus any school or class headers, etc. that may be scanned with the booklet. OmrGen allows the user to define one job at a time. The user may add, edit, or deleted the page definitions of a job. As shown in FIG. 4, The Job Properties window has four tabs that contain parameters for different settings in a Job. These should be set for each job.

The purpose of this dialog box is to allow the user to view and edit job-wide settings and definitions. There are four categories of parameters in the Job Properties dialog box: Reference Mark Find Settings, Scoring Options, Target Size, and Output Options. Tables 1-4 of the incorporated patent describe these in detail, respectively, to the extent not superceded by the present explicit description.

The Reference Mark Find settings category of this dialog box allow the user to modify the settings used in locating and using the reference marks 20A-20B (FIG. 1).

The Scoring Options settings category of this dialog box allow the user modify the parameters which control how the Read Level for each target is computed.

The Target Size settings category of this dialog box allow the user select whether all targets will be defined at one fixed size and, if so, what that one fixed size will be. The settings in this category are actually applied in OmrGen and affect the way OmrGen behaves, and therefore they have only an indirect effect on run-time processing.

The Output Options settings category of this dialog box allow the user modify the parameters which control how the results of each OMR Field and each page are output.

3.10 The REF Properties Tab Window Contains the Following:

3.11 The Reference Mark Find Settings Section Contains:

Minimum Reference Mark Confidence (0-99):—this parameter is used to specify how closely the reference mark on each scanned form must match the Reference Mark Mask in order for it to be considered found. The numeric value represents the minimum percentage of how closely the found mark must match the Reference Mark Mask.

Verify distance between Reference Marks. Maximum distance variation (percentage):—this parameter is used to enable a function that compares the distance between reference marks in the Job Definition with the distance between reference marks in the scanned images. If the variation in the distance between reference marks in the scanned image and the distance between reference marks in the Job definition is greater than the percentage entered in the text box, the scanned image is rejected and an entry is made in the log file. The main purpose of this feature is to attempt to detect the condition where AccuScore finds the wrong object as its reference mark and reject the form rather than to continue to process it with potentially erroneous results. It is recommended that this feature be enabled for most jobs. The "percentage" setting should be set to the lowest value that does not trigger false errors.

3.12 The Search Area Section Contains:

Fix search area of all REF fields to the same size—this parameter causes OmrGen to set the search area of all newly added REF Mark Definitions to a fixed size. Changing this parameter does not alter any existing REF Mark Definitions. With this option selected, when a new REF Mark Definition is created, the user is prevented from changing the size of the search area. To change the sizes of these REF Mark Definitions, this parameter must be de-selected.

Fixed Search Area Width (Inches) and Fixed Search Area Height (Inches)

These parameters are enabled only when the "Fix search area of all REF fields to the same size" checkbox is selected. They define the size of the fixed search area to be applied to all new REF Mark Definitions. The values of these parameters are also used to specify the size applied to all existing REF Mark Definitions when the Apply Size to previously defined REF fields button is clicked. The values specify the distances, in inches, in the four directions from the Mask Area that the engine searches for the reference mark.

Apply Size to previously defined REF fields—this command button is enabled only when the Fix search area of all REF fields to the same size parameter is selected. When clicked, it causes all defined REF Mark Definitions in the Job to have their search areas set to the values entered in the Fixed Search Area Width and Fixed Search Area Height parameters.

3.13 The Timing Mark Usage Section Contains:

Timing Mark Assist:—this parameter is either set to NOT Enabled or Enabled. The default is NOT Enabled. This function is used when one timing mark, used as a reference mark, is found but the second timing mark, used as a reference mark, is not found. Timing marks are illustrated at 21 in FIG. 1. When Timing Mark Assist is enabled, in the event that only either the top or bottom timing mark is found, the application will then search for all the timing marks in the timing track in sequence. It will start with the found reference mark and continue searching for all the timing marks along the length of the page, in sequence, until it reaches the last viewable timing mark. It will then use the last viewable timing mark as a reference mark. If the application does not find ten (10) consecutive timing marks in the timing track, the process will fail. It is recommended that the Verify Distance between Reference Marks feature be used as an additional failsafe when this parameter is Enabled.

Verify Timing Mark Count:—this parameter is either set to NOT Enabled or Enabled. The default is NOT Enabled. This function is used to reduce the number of invalid form registrations. When a top and bottom timing mark, used as reference marks, are both found, this parameter, when enabled, will count all the timing marks to verify that the correct number of timing marks is present on the form. This prevents the incorrect timing mark from being used as a reference mark in the event that one, or more, mark at the top or bottom of the form is obscured by a fold in the form. This feature may be used only with forms that have evenly spaced and uniformly sized timing marks.

Apply REF Corrections:—this parameter is either set to NOT Enabled or Enabled. The default is NOT Enabled. This function is used to reduce the number of invalid marks due to image distortions. When at least one of the reference marks is found, this parameter, when enabled, uses the Timing Mark Assist and Verify Timing Mark Count features to find the locations of all the timing marks on the form. It compares the results from the master image in the job definition to the scanned images and uses the difference in measurements to create a correction factor. The correction factor from each timing mark is used to adjust the position of the geographically closest targets on the form.

When checked, the Timing Mark Assist and Verify Timing Mark Count checkboxes become checked and grayed out so they cannot be changed. The system locates all timing marks on the form. For any given target on the form, the correction factor applied is based on the correction factor of the timing mark that is located closest to the target in addition to a weighted average of any defined reference marks on the page that are not timing marks.

3.14 Timing Mark Properties Section

Figure 5:
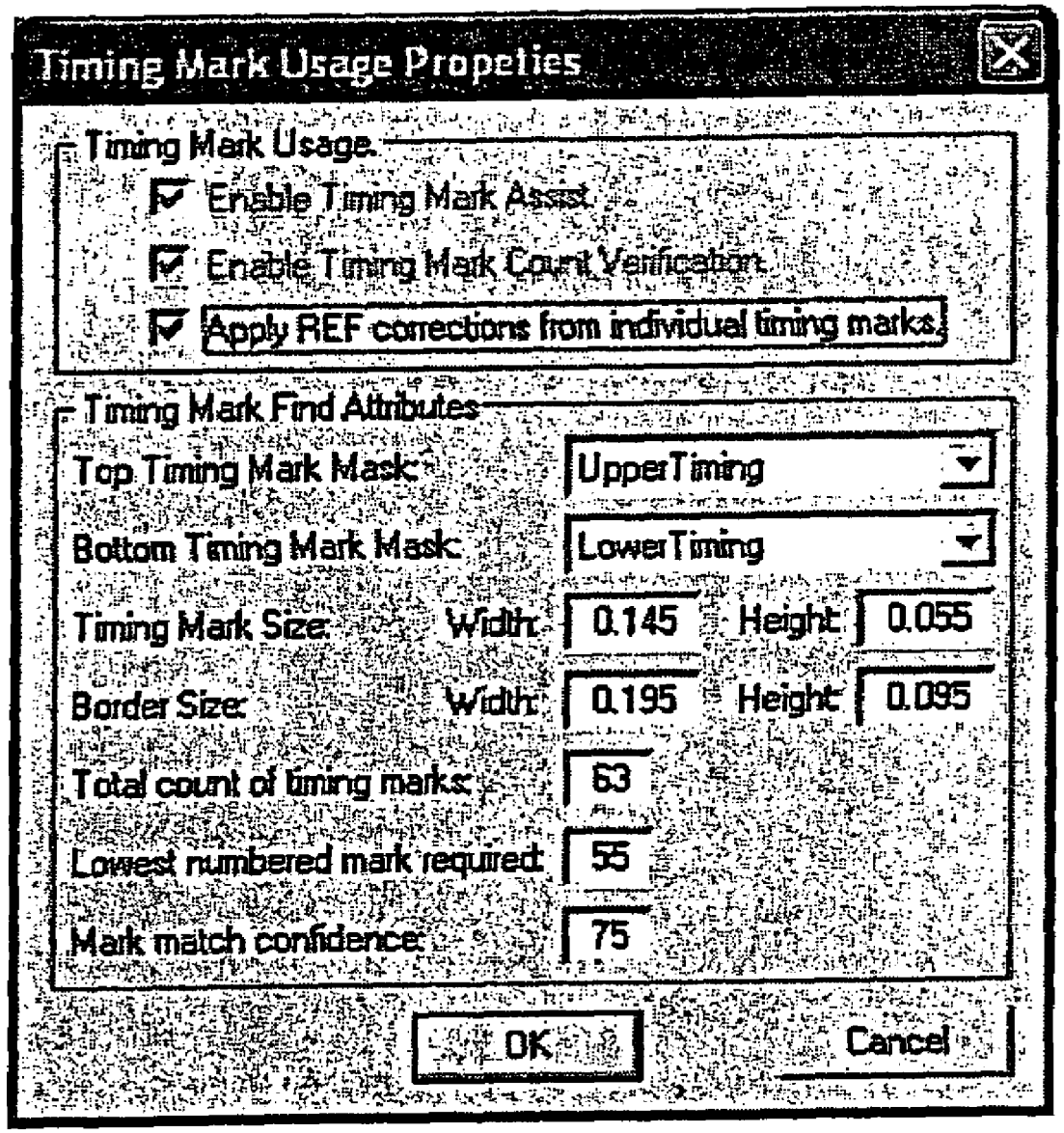
FIG. 5 is a screen shot of the Timing Mark Usage Properties, for specifying whether and how timing marks on the form can be used for locating the field or targets.
Figure 6:
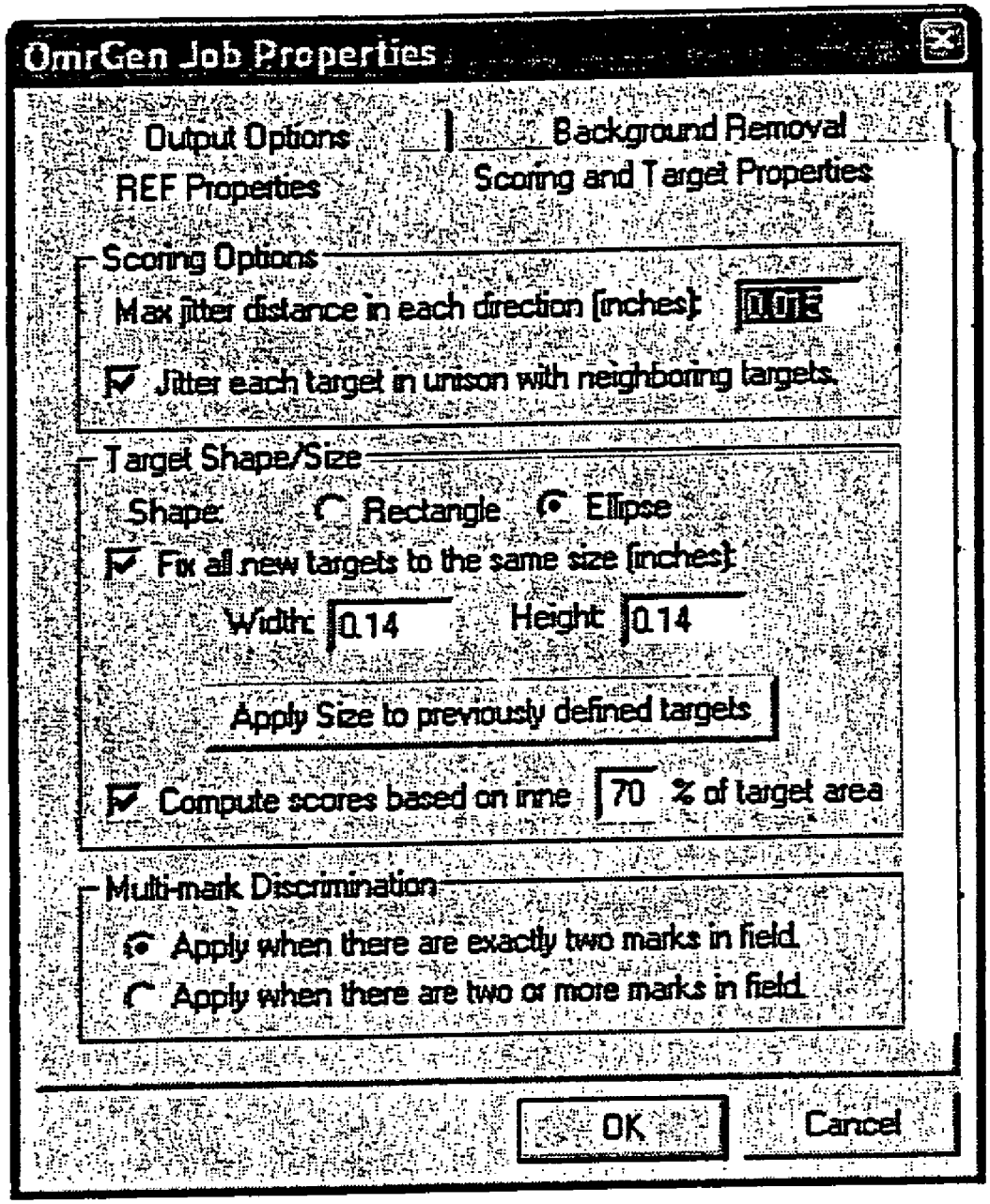
FIG. 6 is a screen shot of the Job Properties dialog box, with the Scoring and Target Properties options displayed.
Figure 7:
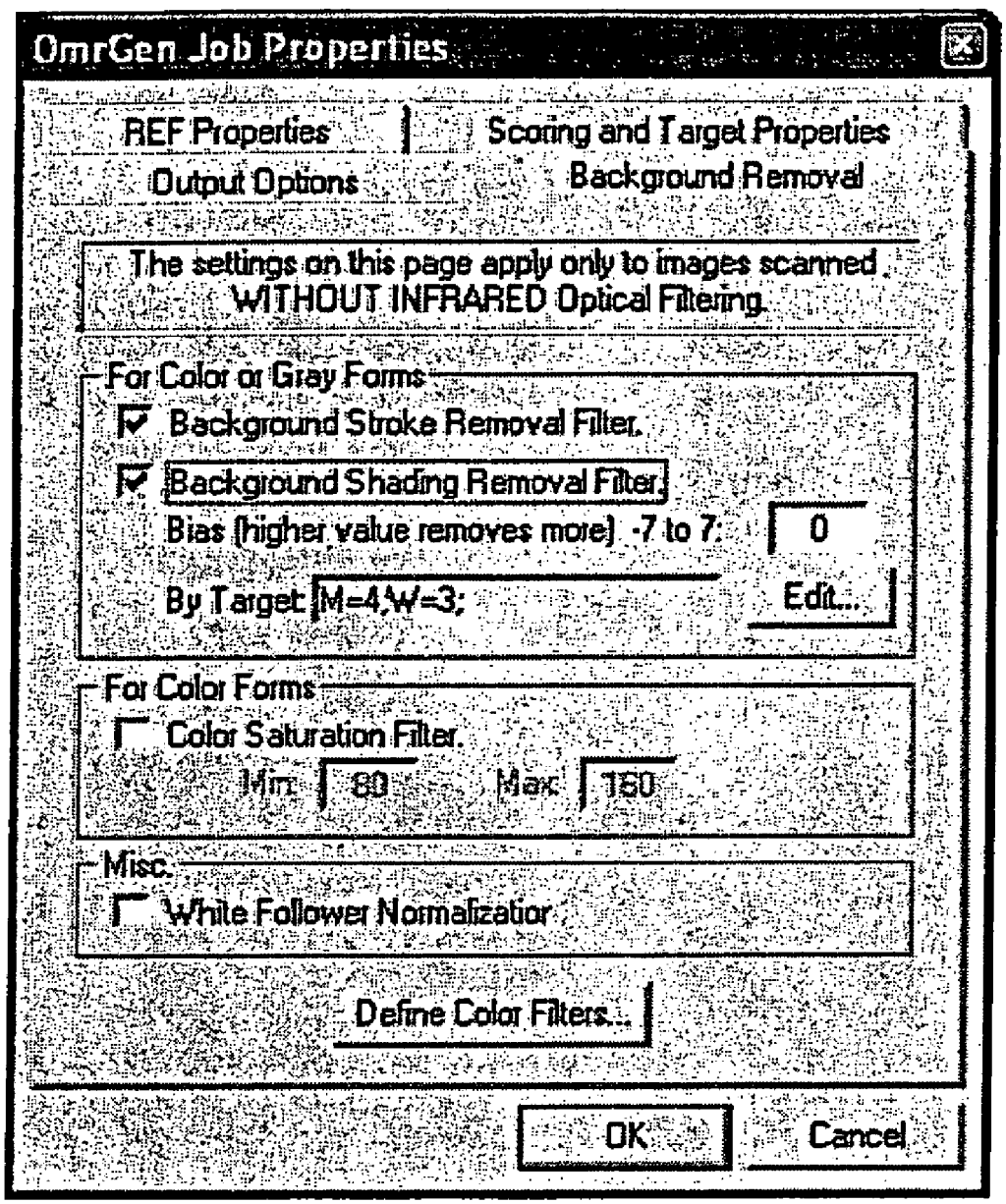
FIG. 7 is a screen shot of the Job Properties dialog box; with the Background Removal options displayed
Figure 8:
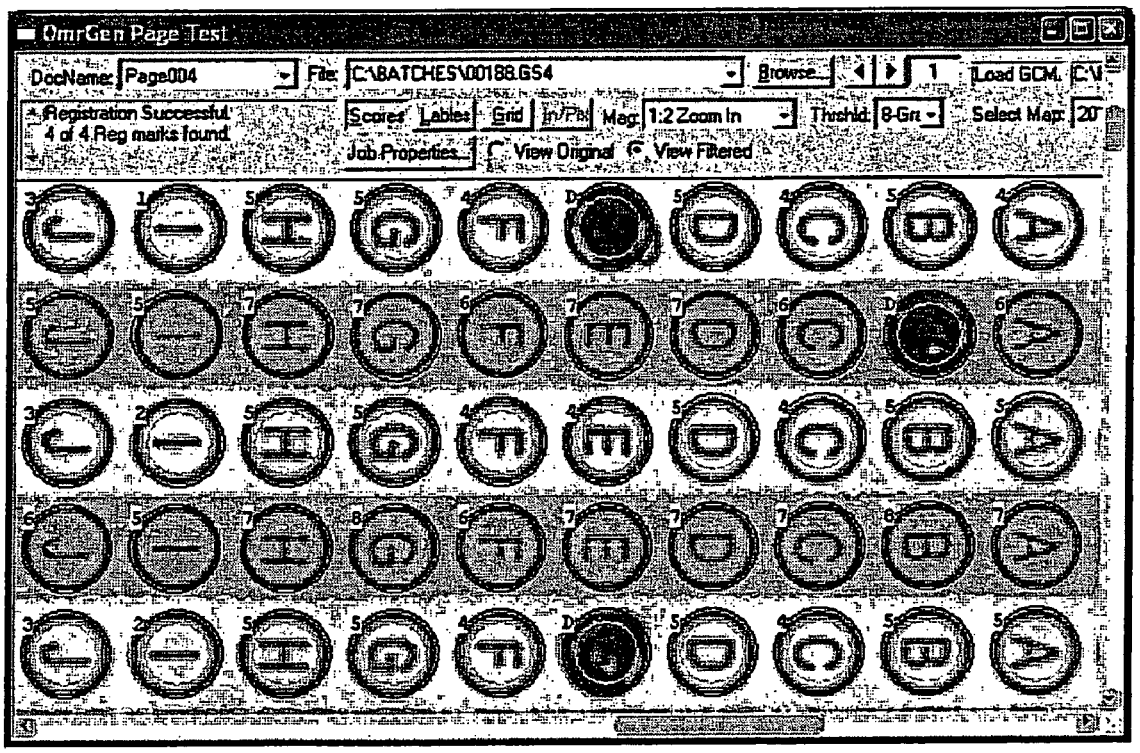
FIG. 8 is a representation of the effect of the Stroke and Shading filters disabled.
Figure 9:
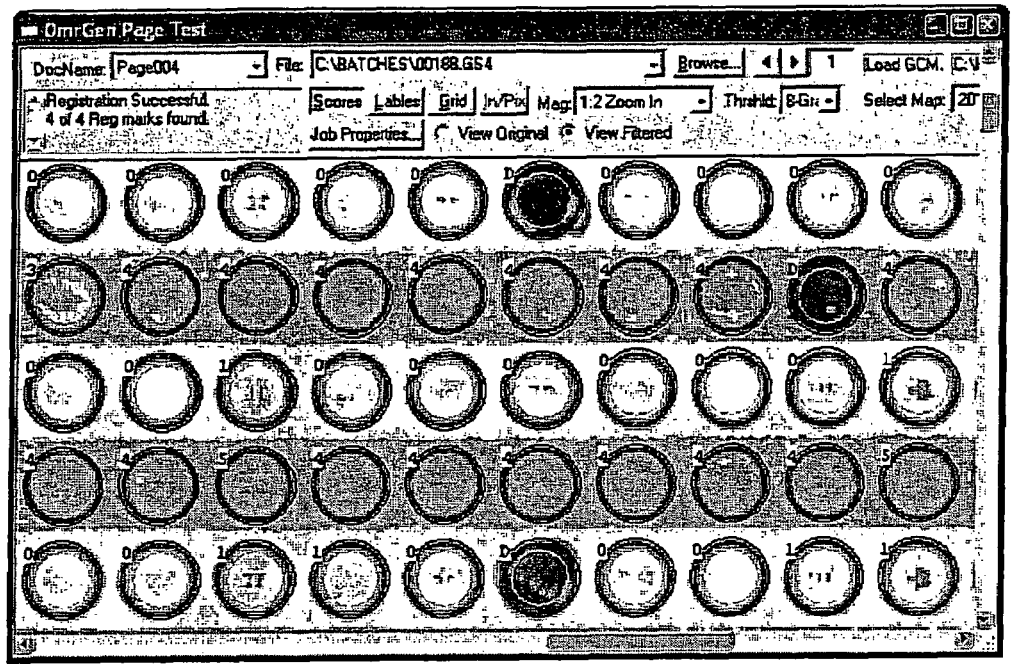
FIG. 9 is a representation of the effect of the Stroke filter enabled.
Figure 10:
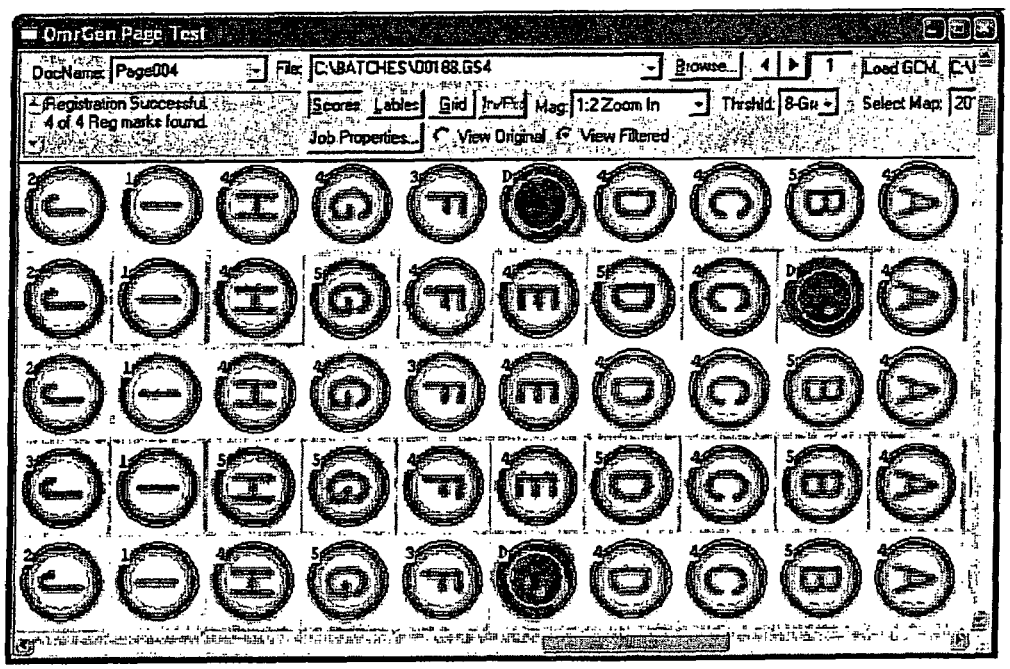
FIG. 10 is a representation of the effect of the Shading filter enabled.
Figure 11:
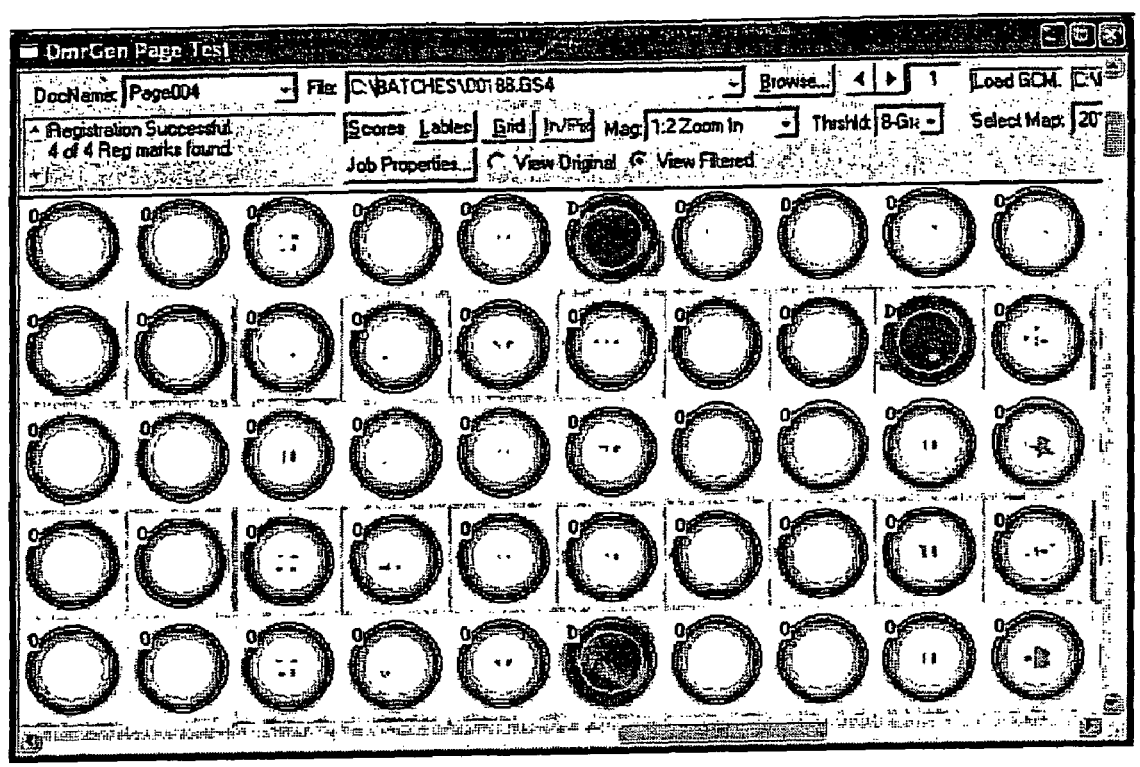
FIG. 11 is a representation of the effect of the Stroke and Shading filters enabled.

FIG. 5 shows the dialog box that is opened by the Timing Mark Properties command button. This is used to set the Timing Mark parameters. If any of the checkboxes in the Timing Mark Usage Properties dialog box are checked, the values in the Timing Mark Find Attributes section MUST be set.

Enable Timing Mark Assist—this enables or disables the Timing Mark Assist function Enable Timing Mark Count Verification—this enables or disables the Verify Timing Mark Count function Apply REF corrections from individual timing marks—this enables or disables the Apply REF Corrections function Top Timing Mark Mask—this is the name of the mask used to define the top timing mark as a reference mark Bottom Timing Mark Mask—this is the name of the mask used to define the bottom timing mark as a reference mark Timing Mark Size: Width/Height—this is the size of the actual black timing mark on the physical piece of paper to be scanned Border Size: Width/Height—this is the size of the white space around the timing mark used in the timing mark search. The recommended size is 0.04ths of an inch larger than the timing mark size Total count of timing marks—this is the number of timing marks in the timing track on the page Lowest numbered mark required—this is the furthest timing mark from the first mark found.

Mark match confidence—this is the confidence with which AccuScore must be certain it has found a timing mark A single checkbox is at the bottom of the window:

Disable use of system-defined REF masks (i.e. use only user-defined REF masks) when adding new REF zones—this parameter is enabled only when there is at least one Mask defined with the usage set to REF. Selecting this parameter disables use of the system-defined REF masks when the user is defining a REF field. This should be selected in the case where a user-defined Mask closely resembles one of the system-defined masks. This prevents the system from matching a system-defined mask to the REF Mask Definition being created.

3.2 The Scoring and Target Properties tab contains parameters that control how the Read Level for each target is computed. It contains the following:

3.21 The Scoring Options Section Contains:

Max jitter distance in each direction (inches)—This parameter specifies the distance that the Target Scoring module searches for each target from its actual defined location. The Target Scoring module shifts (jitters) the location of the Target Definition in all four directions (left, right, up, down), canvassing the entire rectangular area in search of the target.

Jitter each target in unison with neighboring targets—This parameter, when checked, allows each target to be shifted (jittered) in the same direction as the neighboring targets within a predefined radius of approximately 1.5 inches. This function prevents false marks due to target jitter in the wrong direction.

3.22 The Target Shape/Size Section Contains:

Shape—The two possible choices are Rectangle and Ellipse. This parameter specifies whether the Target Scoring module computes the Read Level of each target based on a sensing of a rectangular or elliptical area.

Fix all new targets to the same size—This parameter, when selected, forces all Target definitions added to the Job to be the same designated fixed size. Selecting this parameter does not change previously existing Target definitions. When selected, none of the Target definitions sizes can be modified, including the previously existing Target definitions. When de-selected, all existing Target definitions sizes can be modified.

Width (Inches)

Height (inches)—These parameters specify the fixed size, width and height, that is applied to all Target definitions added to the Job after these parameters are set. These parameters are only active when Fix all new targets to the same size is selected.

Apply Size to previously defined targets—This command button is enabled only when Fix all new targets to the same size is selected. When pressed, all target definitions are set to the size specified by the Fixed Width and Fixed Height parameters. When resized, the existing Target definitions are not moved; their center points remain the same.

The Scoring Calculation for Non-Dropout Targets Section Contains:

Compute scores based on inner percent of specified target area.-- This parameter, when checked, is used to compute the targets' scores by evaluating the specified percentage of the target area. This allows the scoring method to ignore the pre-printed target circle for non-dropout targets when computing each target's score.

3.23 The Multi-Mark Discrimination Section Contains:

Apply when there are exactly two marks in field Apply when there are two or more marks in field—These parameters specify when to apply multi-mark discrimination, either when only two marks appear in a field, or when two or more marks appear. Only one of these can be selected at a time.

3.3 Background Removal Tab contains settings that control whether and how the background removal functions will be processed for each page of the job. Note the filters on this property page are not applied to images that have been scanned using optical infrared dropout. Advanced User mode is required in order to modify the settings for Color Saturation Filter, White Follower Normalization, and Define Color Filters.

3.31 The Color or Gray Forms Section Contain

The Background Stroke Removal Filter checkbox, which controls whether or not the scoring method will remove the preprinted letters and digits within the target circles before computing each target's score. This filter works by removing the thin strokes of the pre-printed text. Since it removes only thin strokes, it does not remove the marks.

The Background Shading Removal Filter checkbox, which controls whether or not the scoring method will remove the preprinted background shading within the target's area before computing each target's score. This filter works by removing only the light background pixels of the pre-printed shading. Since it removes only light background pixels of the shading, it does not remove the marks.

FIGS. 8-11 illustrate the effect of these two filters. The first figure shows an original image with both filters off. The second shows the effect of only the Stroke Removal filter, the third shows the effects of only the Shading Removal filter, and the fourth shows the combined effects of both filters.

The Shading Removal Filter has two parameters that provide for minor adjustments to the darkness level of the background shading that is removed. These parameters are Bias and Bias By Target. In order to remove the background shading, the method determines the darkness level of the background shading, it then removes the pixels at that shading level or lighter. In some cases it is necessary to adjust this process slightly to remove slightly more or fewer pixels. Typically in the case where the printing and shading are very dark, the shading and stroke removal processes may need a little adjustment to sufficiently remove the shading and printing. Often, letters with acute angles (e.g. M and W), when printed in dark ink will need some adjustment. The Bias property is added to (or subtracted from) the dynamically computed shading level to moderately increase (or decrease) the number of pixels removed. This Bias value is applied equally to all targets in the job.

Figure 12:
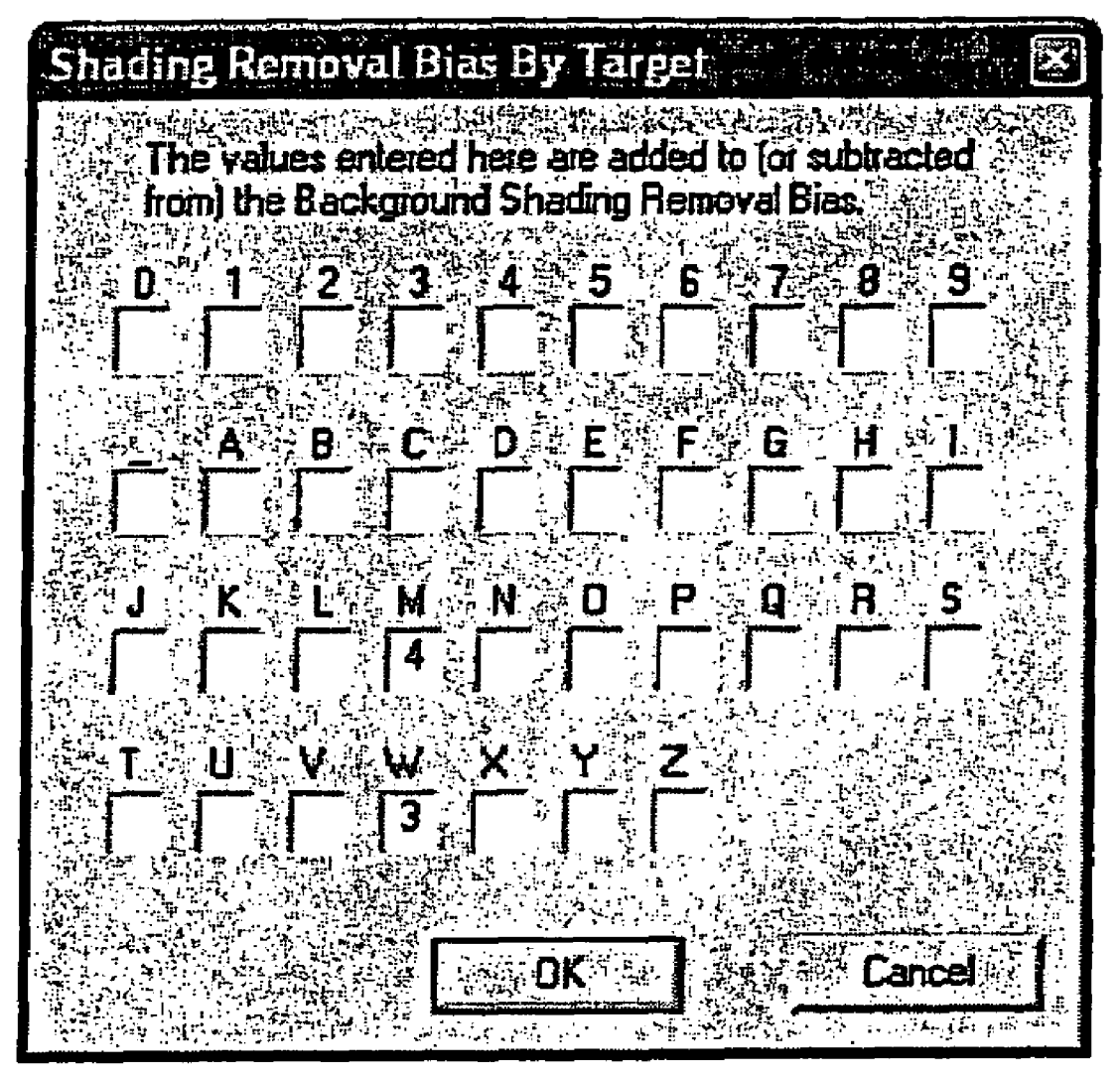

Since some target characters require more background pixels removed than others (e.g. M and W need more pixels removed than I or L), a second adjustment parameter is provided. The Bias By Target parameter allows separate bias values to be specified for individual target labels. The values defined for the Bias By Target parameter are added to (or subtracted from) the Bias parameter. To specify the values for the Shading Removal Bias By Target parameter, click the "Edit" button under the Background Shading Removal Filter option. This button brings up the Shading Removal Bias By Target window, shown in FIG. 12.

The Shading Removal Bias By Target window allows a bias value to be specified for each letter A-Z and each digit 0-9. The bias values entered are applied to the targets whose target labels correspond to the letter or digit.

3.32 The Color Forms Section

The Color Saturation Filter checkbox controls whether or not the method will perform background removal using the Color Saturation method. When enabled, this filter will be applied to only images that have been captured in 24-bit color and only for document types where color processing has been enabled (see the "Enable Color Processing" checkbox on the OmrGen Page Properties window).

The pixels of a 24-bit color image can be converted into the three sub-components of hue, saturation, and luminance. (For a visual illustration of the hue, saturation, and luminance components of any color, reference is made to the "Define Custom Colors" window in various Microsoft applications such as Microsoft Paint.) This filter works independent of the hue and luminance components of the form's background color. It operates only on the saturation component of the form's color. This filter works by determining the color saturation level of the pre-printed form, and then removing pixels are at that color saturation level or higher. This filter works best for forms in which the color saturation of the form's background printing is fairly high. Since pencil marks generally have a very low color saturation level, this filter removes primarily pixels of the pre-printed form, and retains most of the pixels of the pencil marks.

Two parameters are associated with this filter, Min and Max. The saturation component of a color is represented by a number in the range of 0 to 240, where 0 is least saturated (representing all shades of gray from white to black) and 240 is a fully saturated color. This filter samples the image to try to determine an optimum saturation threshold for removing pixels. The Min and Max parameters set limits on the saturation threshold value that will be used. The Min value specifies a saturation level below which all pixels will be retained, and the Max value specifies a saturation level above which all pixels will be removed. The dynamically computed saturation threshold will be in the range between these two numbers. The default values for these two settings should not be modified unless empirical testing shows that a greater or lesser amount of pixels need to be removed for a given booklet.

This filter provides an alternative method for processing certain forms that have very dark printing in a highly saturated color. For such cases, the dark printing may reduce the effectiveness of the Background Stroke Removal filter and/or the Background Shading Removal filter. This filter may be used in conjunction with the Background Stroke Removal, or with both the Background Stroke Removal and Shading Removal filters together, to more effectively remove the background.

3.33 The White Follower Normalization checkbox enables/disables the White Follower image normalization filter. The purpose of this filter is not related to background removal. It is used for attempting to product more overall consistent results from images scanned with different scanners. Its purpose is to attempt to provide some minor compensation for the variations in the image capture "brightness" level that exists between different scanners. This filter works by sampling each image to determine the luminance level of the majority area of the background of the image. It then linearly "lighten" the whole image just enough so that the background of the major portion of the image's background becomes white.

3.34 When the Define Color Filters button is pressed, the OmrGen Color Filters option becomes available.

In most cases removal of the pre-printed background form from an image can be performed effectively using the Background Stroke Removal and Background Shading Removal filters. However there may be some special rare cases where the results are not completely satisfactory. Color Filters are used only with images that are captured in 24-bit color and only with page definitions for which the Enable Color Processing property is set to on. Color Filters are used to specify specific ranges of colors to remove from an image or ranges of colors or levels of gray retain on the image for further processing.

4.0 REF Field Definitions

The REF Field Definitions define the precise locations of the reference marks on the page, as well as the "search area" for each reference mark. A "reference mark" is a pre-printed symbol on the page used to realign an image to compensate for image capture distortion. The search area for each REF Field is defined by the user, and OmrGen automatically computes the exact location of the reference mark within the defined search area. This is done to achieve the most precise definition possible of the reference mark location.

5.0 Detailed Description of Stroke and Shade Removal Filters

Figure 13:
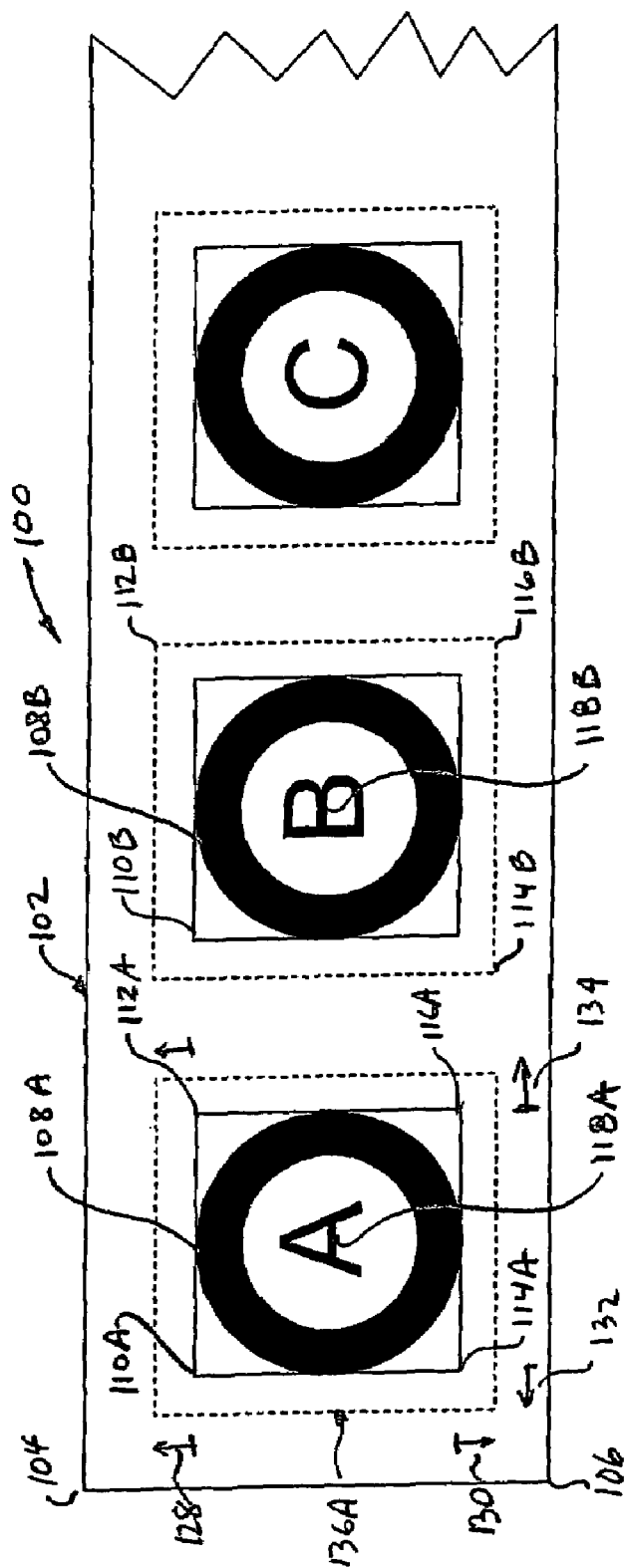
FIG. 13 is a schematic of a portion of a field, showing a plurality of targets with coordinates to illustrate the preferred method of improving the accuracy of the inferred targets locations.
Figure 14:
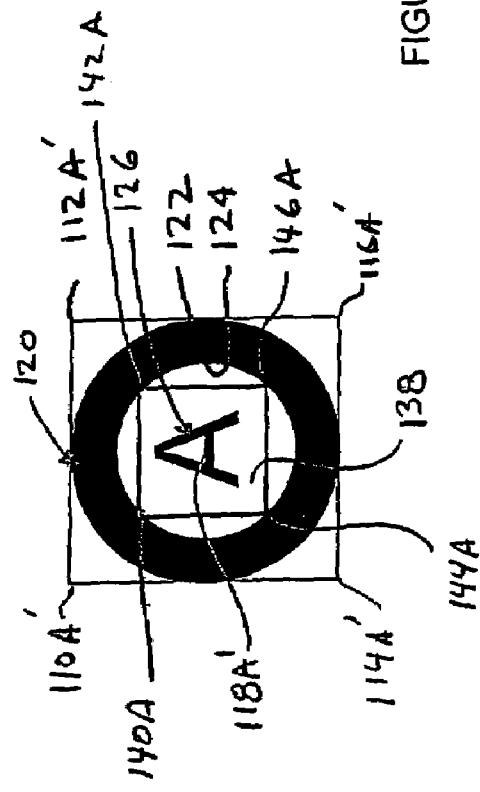
FIG. 14 is a schematic detail of one target shown in FIG. 13, to illustrate how the printed outline of the target is removed from contributing to the mark interpretation logic.

FIGS. 13 and 14 illustrate the preferred technique for accurately locating the targets within a given sub-field 100. For present purposes, the sub-field 100 correspond to a field that has only one target group. The sub-field field has a group, A, B, C . . . 102 of targets within a rectangular specification defined by the coordinates at corners such as 104, 106 (the other two not being shown), which have already been adjusted, if necessary, based on the comparison of the evaluation of the reference marks on the form, relative to the master form. The purpose of this next step is to locate with greater accuracy, the locations of the targets, such as 108A, 108B. Typically, 4, 5, or more targets will be associated with a given group 102. Each target has a target rectangular area specification an adjusted location based on the comparison with the master form, defined by the rectangular coordinates at the four corners of a rectangle such as 110A, 112A, 114A, and 116A. This rectangle encompasses the target 108A with an implied center 118A. The adjacent target likewise has the attributes of the four corners 110B, 112B, 114B, and 116B, with an associated center 118B.

In general, each target consists of an outline, such as a ring or annulus 120, having a line thickness, in this case defined by the difference between the outer diameter 122 and the inner diameter 124. These are known a priori from the characteristics of the printed form. Within the outline 120, a symbol or character is typically centered, such as the letter A at 126. In general, the outer diameter 122 of the target is equal to, or in a known relationship with, the length of one of the adjacent sides of the immediately surrounding rectangle defined by coordinates 110A-116A.

The preferred processing first accurately locates each target, and based on the prior determination or knowledge of the location and thickness of the ring or outline 120, establish a sensing area 138 within and containing a predetermined fraction of the ring 120 and the area bound by that ring. When the ring is precisely located, in the scoring logic the pixels corresponding to the ring can be excluded from the sensing area (or alternatively set to a white or low gray scale value), thereby assuring that the ring 120 will not be considered as a contributor to a potential mark entered by the subject on a given target. In particular, if a group 102 contains five targets 108, only one of which is to be marked, the elimination of the ring 120 from consideration will assure that none of the five rings will be a contributor to the sensing and evaluation of a mark. Preferably, the scoring administrator will set the parameters such that, for example, only the central 70% of the diameter of the target (or optionally a rectangle within the ring) will be sensed for a mark (e.g., in area 138).

In order to more accurately identify the target locations, and thus more accurately eliminate the gray scale content of each ring 120, a "jitter" procedure is used over a search zone to fine tune the locations of each target as initially determined by a comparison of the reference marks on the form to be scored, against the master form. The coordinates 110, 112, 114, and 116 shown in FIG. 13, correspond to the initial coordinates so determined. All of the targets in a suitable neighborhood are sampled, pixel by pixel. The neighborhood could extend into an adjacent question field. In the illustrated embodiment, all the pixels are sampled within the area bounded by coordinates 110, 112, 114, 116 for each target and an aggregated gray scale modal value or average darkness for the group is computed. Next, all of the coordinates are shifted by a user specified distance, in each of four directions, such as up 128, down 130, left 132, and right 134. The areas within the same size target rectangle (110-116) are sampled and the modal or total average darkness values determined. When this is completed, there are at least five conditions, the original and the four shifted conditions, each of which has an associated total modal or average darkness. That one condition of the five, having the highest total modal or average darkness is selected as the most accurate of the five (or more)

conditions for specifying the locations of the targets. The particular one of those five conditions is shown in FIG. 14, by the coordinates 110A', 112A', 114A', and 116A', with the associated center shown at 118A'.

In other words, the sampling area defined by rectangle 110A-116A is shifted sequentially in four directions to cover the search zone area within rectangle 136A to fine tune where the target should be located within the larger rectangle 136A. This is also performed for the other targets with the important preferred characteristic that all of the targets are shifted at the same time and the final location is based on the aggregated darkness of all the targets for each of the shift conditions.

In another embodiment of "jitter", the neighbors are the collection of targets within the user specified search zone radius of, for example, 1.5 inches from the center of a given target, without regard to the groups or fields with which such targets are associated. The purpose of the jitter is to better match the image of the form target by target with the master, e.g., overcome image distortion. Distortion can be local, and neighboring but not more remote targets are likely to be affected similarly. The jitter is performed for each target based on its neighbors, so the optimized position for one target does not depend on the optimized position of other targets. In a manner similar to that described above, for each target and its neighbors within, e.g., 1.5 inches, an initial and then multiple shifted sampling and gray scale analyses are performed. The final target position is selected from among the initial and shifted that gives the strongest indication of darkness, such as the mode of the pixel gray scale distribution.

FIG. 14 shows the outline 120 of the target in its most accurate location, e.g., after the jitter processing, from which associated gray scale values of the ring 120 can be ignored in the scoring logic as discussed above. In one embodiment, the percent of the target to be sensed for finding a subject's mark, such as 70%, would correspond to an inner circle having a diameter approximately equal to the inner diameter 124 of the ring 120. Alternatively, a rectangle defined by points 140A, 142A, 144A and 146A can be used for the sensing area 138 within the outline. This sensing area 138 area should be large enough to encompass the symbol 126, which is typically centered at 118A'. If the subject follows the directions for filling in the entire intended target with a pencil mark, considerable leeway is provided in that the subject will fill in at least 70% of the area of the target. However, inasmuch as the character 126 occupies a substantial fraction of that area, the mark interpretation algorithm would likely consider the pre-printed character to represent a mark and, thus, even if one target were properly and completely filled in by the user, the interpretation logic would likely determine that all five, or at least more than one, of the targets was an attempted mark, and the results would either be an inaccurate score or an excessive number of indeterminate scores requiring manual scoring.

Figure 15:
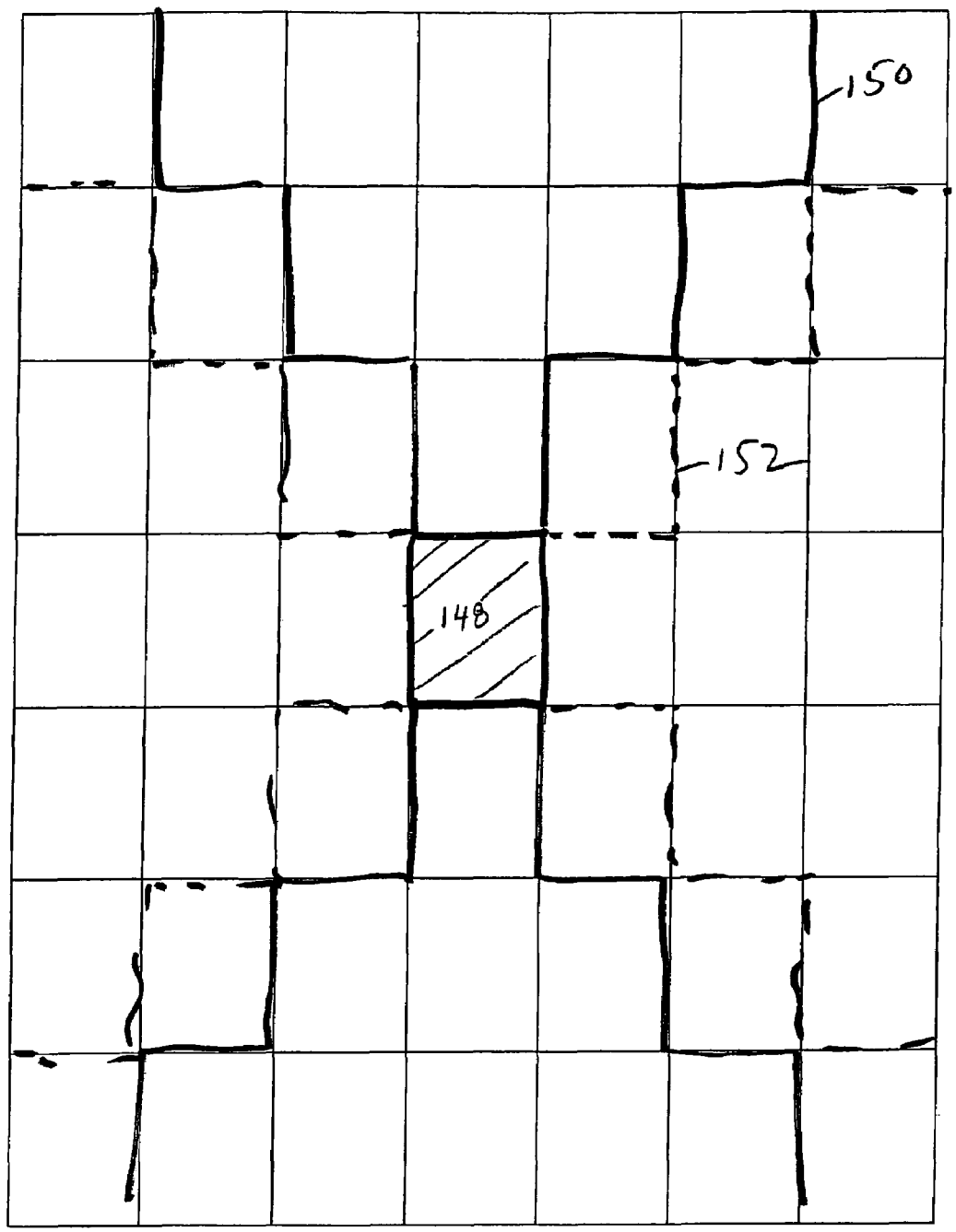
FIG. 15 is a schematic illustrating how a multi-pass filter can remove thin printed lines corresponding to a character or symbol within the outline of a target, from contributing significantly to the mark interpretation logic.
Figure 16:
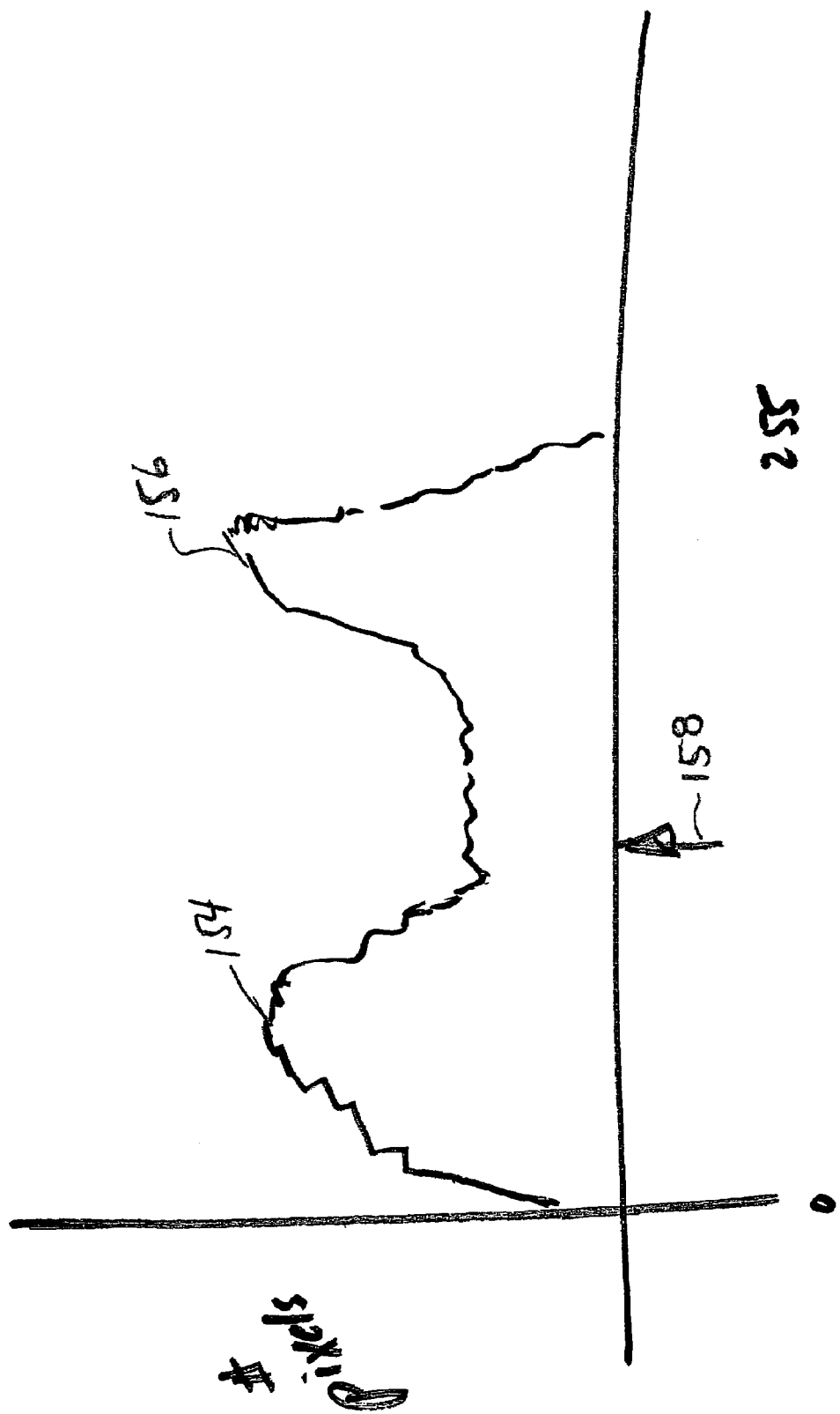
FIG. 16 is a graphical representation of how a user index can be set for adjusting the degree to which the shading filter removes background shading from contributing significantly to the mark interpretation logic.

FIG. 15 is a schematic representation of the preferred implementation of a "stroke filter" by which the gray scale values of the character can be minimized or eliminated from consideration in the evaluation or interpretation of whether a subject intended to mark a particular target. It is known a priori that the character is formed by relatively thin lines. This erosion-type filter samples each pixel within the sensing area 138 (FIG. 14), and by looking at the darkness values of the immediate and surrounding neighbors of a given pixel 148, lightens the given pixel if there is a light pixel near the given pixel 148 while keeping the darkness value of the given pixel if the near pixels are dark. The purpose is to eliminate the influence of the characters, while assuring that an intentional mark is not excessively eroded. Erosion filters are known in other imaging fields such as optical character recognition, and those can be used for the present purpose. However, a preferred form of erosion filter looks at each pixel 148 as centered in, for example, a 7×7 grid. A plurality of filter passes are made, for example, vertical, horizontal and oblique, to evaluate the neighbors of the given pixel 148 for inferring whether that given pixel 148 is part of a straight vertical line, a straight horizontal line or an oblique line. Almost all characters are formed from a combination of vertical, horizontal and oblique lines.

FIG. 15 shows schematically the outline of the search region or pattern of a vertical pass 150 and a horizontal pass 152 (an oblique pass is not shown). For example, in the vertical pass 150, the procedure looks at the outlined pixels above and below the given pixel 148. If the given pixel 148 is part of a thin horizontal line, relatively close neighbors above and below should be white. Thus, if a white pixel is found on both the top and bottom of the sample region 150, the gray scale of the given pixel 148 will be reduced. Preferably, the gray scale value will be reduced to match the lightest of the gray scale values of the other pixels in the sampling region 150. If a relatively white pixel is found on only one side of the region 150, then the gray scale value of the target pixel 148 is not changed.

As stated above, this is performed for each pixel in the sensing area 138, with at least vertical and horizontal, and preferably with oblique passes. For the horizontal pass in region 152, the outlined pixels to the left and right of the given pixel 148 will be sampled and, if a white pixel is found on both sides, the value of the given pixel will be reduced to the gray scale value of the lightest pixel found in region 152. With respect to the stroke filter, a given target pixel is preferably subject to three passes, and the given pixel 148 is turned white in the mark evaluation logic if any of the three passes indicates that it should be turned white.

It should be appreciated that gray scale values will typically run from 0 for pure white, to 255 for pure black. In a bi-tonal form, the background of the form would be near white and each printed target would be near black. In the more common gray scale forms, however, the gray scale of the background would be in the range of 20-50. For maintaining consistency in the mark evaluation logic, the resetting of a given pixel 148 should closely match the minimum gray scale of the surrounding "white pixels", which would be in the range of 20-50, rather than pure white.

Preferably, all three passes, horizontal, vertical, and oblique, are performed on a particular pixel 148, and its possibly modified value is stored separately, before moving on to process another particular pixel. Thus, when examining the neighboring pixels of a particular pixel 148, as defined by regions 150 and 152, the original gray scale values of each of these neighboring pixels as captured in the scan are used, rather than their possibly modified values. In other words, the gray scale value of a particular pixel 148 may be reset in the course of performing the mark interpretation logic, but for each step or sequence that may involve the same pixel, the step uses the captured gray scale value, not the value as may have been adjusted in a previous step.

Of course, the erosion filter has the purpose of removing from consideration in the scoring, the characters that are in the targets for which no mark is intended. It is of no consequence whether the character lines are removed in a target that is intended to be marked. If fact, in a well-marked target, none of the pixels forming the underlying character, would have their gray scale values reset to a lighter value.

Forms may also be printed in various colors. Similarly, scanners can be limited or adjustable to scan in bi-tonal, gray scale, or color. For the present invention, even bi-tonal forms should be scanned in gray scale or color. Moreover, as is well known, the image scanned in color can readily be digitally stored in a format by which color can be represented in any of the RGB, $YC_BC_R$, or HLS format and, and as is also well known, one format can be mathematically related to the other format, even if the data was originally stored in the other format. Thus, it is a routine matter for one of ordinary skill in this field to arrive at the gray scale component, i.e., "Y" component of the $YC_BC_R$ representation, or derive the equivalent of the Y component from an RGB or HLS representation.

As shown in FIG. 3, some forms have shading, forming stripes or the like that either cover an entire group or portions of a group such that some targets of a group have a light background, for example, 20-50, whereas other targets in the same group have a darker background such as 100-150. Typically, all targets of a given group are in the same "stripe", but this may not always be the case. For accurate scoring, even with the character contribution effectively removed by the erosion filter, if a target that is not marked nevertheless has a fully or partially shaded sensing area 138, this could erroneously be recorded as a mark or, if not adequately distinguishable from a much darker intended mark, the response could be deemed indeterminate and therefore require manual scoring.

In a further target filtering according to the invention, the effective background shading is accounted for. With reference again to FIGS. 3 and 13, the original coordinates 104, 106 and the associated two others not shown for a sub field 100 associated with group 102 can be used or an adjusted set can be used based on the "jitter" step described above. As a practical matter, the most straightforward technique is to sample all of the pixels in the field for group 102 and determine the statistical mode gray scale value for the entire field. The statistical mode is deemed an indicator of the background shading. At scoring for that field, every pixel at or below the statistical mode, or the mode plus a threshold increment, is turned white. Preferably, in this first step, the statistical mode is determined for only the pixels that are within the sub-field 100 but excluding the (in this case) circular areas (rings) of the targets 108. Most preferably, a special region is defined by a rectangle that borders substantially tangentially (e.g., two pixels outside) the upper and lower edges of all target circles in a group and the left and right edges of the left-most and right-most targets in the group. The statistical mode of the gray scale values within the special region excluding the targets is computed. The term "background indicator" should be understood as referring to an average, mode, or similar quantification of a value commensurate with background shading.

Before computing the statistical mode, the inevitable variation of the gray scale value of each pixel relative to its theoretical gray scale value can be adjusted to some extent by a smoothing step. In this step, the gray scale value of each given pixel to be used in the statistical analysis, is the average of the given pixel and a plurality, such as three, neighbors. This average value for each pixel results in a distribution from which the mode is determined. As an example, each target is rank ordered (e.g., plotted), preferably as a histogram whereby the number of pixels at a given gray scale value is plotted against a gray scale range from 0 to 255. Based on the histogram, the user can set an index, which has the effect of ignoring any gray scale values below that of the index, while utilizing pixels with gray scale values above the index. Preferably, the index sets a threshold by adding a bias to the mode. For example, if the statistical mode is a gray scale value of 68, a bias index of 16 or 24 can be added such that a shading threshold of 82 is established. Generally, the index will be no greater than 32 gray scale points.

A simpler, alternative approach to removing shading can be set as the default suitable for most situations, while offering the foregoing method as an option for handling irregular shading. In the simpler approach, advantage is taken of the previously made point with respect to FIG. 3, that in most shaded forms, in a given section field containing a plurality of questions having the same format, all the odd numbered questions are shaded and all the even numbered question are not, or visa versa. Rather than analyze shading on a sub-field or special region basis for each group, one generic analysis is made for all odd numbered (shaded) groups and another generic analysis is made for all even numbered (non-shaded) groups. In this approach, a first statistical mode is found for all the non-target pixels of all the shaded groups, and another statistical mode is found for all the non-target pixels of all the non-shaded groups. A bias is preferably set for each, resulting in first and second threshold gray scale darkness values that are to be subsequently used for analyzing all targets in odd numbered questions and all targets in even numbered questions, respectively.

Whether the background shading is determined according to the either of the foregoing methods, the second step is performed to distinguish the darkness of an intended mark from the background pixels that are at or above the threshold darkness. In this step, the gray scale value of each pixel associated with the sensing area is sampled and if the value is at or below the shading threshold (82 in the foregoing example) that pixel is ignored or discarded. The remaining pixels in the sensing area of each target in a group are analyzed according to the scoring algorithm (such as described in the incorporated patent disclosure) and an output recorded for the subject's response to that group of targets (i.e., no response, indeterminate response, or selected target A, B, C, etc.).

The invention claimed is:

1. A method of scoring a printed form having a plurality of preprinted reference marks at known locations and spatial relationships and a preprinted group of bubble targets, each target having a known size and shape at known nominal locations, the bubble targets representing possible responses to a question associated with the form, each target of the target group to be marked or left blank by the subject for the purpose of recording said response, comprising:

with a non-dropout scanner, producing a digital virtual form file from the preprinted form, which virtual form defines a virtual layout of the printed form on a virtual coordinate system;

non-dropout scanning the marked form to produce a marked form file of gray scale darkness values;

comparing the marked form file and the virtual form file to determine the locations and spatial relationships of the reference marks in the marked form file according to the virtual coordinate system;

based on the locations and spatial relationships of the reference marks according to the virtual coordinate system, establishing the nominal virtual coordinate location of each target in the marked form file;

sampling the gray scale darkness values at each nominal target location and producing an interpreted mark darkness value for each target of the marked form file;

interpreting whether the darkness value of the interpreted mark is to be deemed an intentional response; and producing as an output, a scored form file containing a scored value for each target group or target on the marked form page;

wherein said production of an interpreted mark darkness value for each target is preceded by filtering out the gray scale contributions of the printed targets at each target location.

2. The method of claim 1, wherein each target is printed over a background color and said production of an interpreted mark darkness value includes filtering out the gray scale contributions of the background color.

3. The method of claim 1, wherein the filtering is by an erosion filter.

4. The method of claim 1, wherein the form has the targets printed on a substrate as an outline and an alphanumeric symbol within the outline, the marked form file includes a digital scan file of pixels having respective gray scale values including the targets, and the production of an interpreted mark darkness value for each target comprises:
  defining a sensing area of pixels within the outline;
  in the sensing area, comparing pixel gray scale values to filter out at least some of the pixels associated with the symbol;
  applying evaluation criteria to the pattern of gray scale pixel values in the filtered sensing area; and
  from the applied evaluation criteria, generating a darkness value for the target.

5. The method of claim 4, wherein the filtering is by an erosion filter.

6. The method of claim 4, wherein the filtering out of at least some pixels associated with the symbol includes,
  sampling each pixel in the sensing area and for each sampled pixel sampling at least two predetermined patterns of a multiplicity of neighboring pixels to identify thin line patterns of pixels that are darker than said substrate;
  comparing the sampled pixel with the pattern of neighbors; and
  erosion filtering out pixels in the sensing area that do not have a sufficient number of dark pixel neighbors.

7. The method of claim 6, wherein the erosion filter performs multiple passes around each pixel in the sensing area, each pass spanning respective patterns of pixels that are located in substantially horizontal, vertical, and oblique relation to each pixel.

8. The method of claim 7, wherein for the pass that spans a substantially vertical pattern, for a candidate pixel, if pixels on the left and right are both white, the candidate pixel will be reduced to a filtered gray scale value equal to the captured gray scale value of the lightest pixel in the pattern, but if a pixel on the left or right of the candidate pixel is black, then the gray scale value of the candidate pixel is not changed.

9. A method of scoring a printed form having a plurality of preprinted reference marks of known size and shape at known nominal locations and a preprinted group of bubble targets, each target having a known size and shape at known nominal locations and printed on a background of one of at least two background gray scale shading values, the bubble targets representing possible responses to a question associated with the form, each target of the target group to be marked or left blank by the subject for the purpose of recording said response, comprising:
  producing a digital virtual form file from the preprinted form, which digital form defines a virtual layout of the printed form by sets of coordinates on a virtual form coordinate system;
  digitally scanning the marked form to produce a marked form file of gray scale darkness values;
  assigning each pixel of the marked form file, to a coordinate of the virtual form coordinate system;
  processing the marked form file to determine the locations and spatial relationships of the reference marks according to virtual form coordinate system;
  comparing the locations and spatial relationships of the reference marks of the marked form file to the locations and spatial relationships of the reference marks in the virtual form file, and adjusting the nominal location of each target in the virtual form file according to this comparison;
  applying search criteria for sampling the darkness values of the pixels in a search zone at each adjusted nominal location and producing an interpreted mark darkness value for each target;
  applying read criteria for interpreting whether the darkness value of the interpreted mark is to be deemed an intentional response;
  applying logic criteria for permitted relationships between plural targets in a given target group; and
  producing as an output, a scored form file containing a scored value for each target group or target on the marked form page of said subject;
  wherein said production of an interpreted mark darkness value for each target includes applying a first filter to remove the contribution of the gray scale values of the printed target in the search zone and applying another filter to remove the contribution of gray scale values of the background shading in the search zone.

10. The method of claim 9, wherein the form has the targets printed on a substrate as an outline and an alphanumeric symbol within the outline, the marked form file includes a digital scan file of pixels having respective gray scale values including the targets and shading, and the production of an interpreted mark darkness value for each target comprises:
  defining a sensing area of pixels within the outline; and
  filtering out of the sensing area, pixels having a darkness value below a threshold value commensurate with the background shading of the target.

11. The method of claim 10, wherein the threshold value is commensurate with the statistical distribution of pixel darkness values over an area that includes a plurality of targets but excluding the outlines of the targets.

12. The method of claim 11, wherein the threshold value is dependent on the statistical mode of said statistical distribution.

13. The method of claim 12, wherein the threshold value is within 32 gray scale points of the statistical mode.

* * * * *